(12) United States Patent
Ushijima

(10) Patent No.: US 7,541,749 B2
(45) Date of Patent: *Jun. 2, 2009

(54) CURRENT-MODE RESONANT INVERTER CIRCUIT FOR DISCHARGE LAMP

(75) Inventor: Masakazu Ushijima, 30-24 Nogata 6-chome, Nakano-ku, Tokyo (JP)

(73) Assignees: Masakazu Ushijima, Tokyo (JP); Hong-Fei Chen, Taichung, Taiwan (CN)

( * ) Notice: Subject to any disclaimer, the term of this patent is extended or adjusted under 35 U.S.C. 154(b) by 217 days.

This patent is subject to a terminal disclaimer.

(21) Appl. No.: 11/329,068

(22) Filed: Jan. 11, 2006

(65) Prior Publication Data

US 2006/0152174 A1    Jul. 13, 2006

(30) Foreign Application Priority Data

Jan. 12, 2005    (JP)    ............................. 2005-005410

(51) Int. Cl.
*H05B 37/02* (2006.01)

(52) U.S. Cl. ................... 315/291; 315/210; 315/209 R; 315/244; 363/22

(58) Field of Classification Search ............ 315/57, 315/97, 105, 201, 205, 208, 209 R, 210, 219, 315/220, 223, 224, 225, 226, 232, 239, 240, 315/241, 241 R, 242, 243, 244, 248, 265, 315/276, 277, 278, 283, 287, 291, 307, 308, 315/312, 370, 371, 389, 397, 399, 400, 403, 315/406, 408, 410, 411, DIG. 2, DIG. 4, 315/DIG. 5, DIG. 7; 363/15, 16, 17, 18, 363/19, 20, 21.11, 21.18, 21.02, 21.03, 21.04, 363/22, 25, 26, 27, 28, 37, 40, 41, 48, 49, 363/54, 56.07, 57, 58, 61, 71, 74, 75, 79, 363/86, 90, 91, 96, 97, 98, 126, 131, 132, 363/133, 134, 135, 136, 139

See application file for complete search history.

(56) References Cited

U.S. PATENT DOCUMENTS

| | | | | |
|---|---|---|---|---|
| 4,060,751 A | * | 11/1977 | Anderson | ............... 315/209 R |
| 5,324,906 A | * | 6/1994 | Dong | ......................... 219/626 |
| 5,495,405 A | | 2/1996 | Fujimura et al. | |
| 6,084,785 A | * | 7/2000 | Kunisada et al. | .............. 363/37 |
| 6,114,814 A | | 9/2000 | Shannon et al. | |
| 6,259,615 B1 | | 7/2001 | Lin | |
| 6,633,138 B2 | | 10/2003 | Shannon et al. | |
| 6,774,580 B2 | | 8/2004 | Suzuki et al. | |
| 7,453,216 B2 | * | 11/2008 | Ushijima | ................ 315/209 R |
| 2003/0025510 A1 | * | 2/2003 | Ichimasa et al. | ............ 324/547 |
| 2006/0193152 A1 | * | 8/2006 | Ushijima | ..................... 363/13 |

FOREIGN PATENT DOCUMENTS

| | | |
|---|---|---|
| JP | 56-088678 | 7/1981 |
| JP | 59-32370 A | 2/1984 |
| JP | 63-5996 | 2/1988 |
| JP | 7-211472 A | 8/1995 |
| JP | 8-288080 A | 11/1996 |
| JP | 2733817 B2 | 9/1998 |
| JP | 2002-233158 A | 8/2002 |
| JP | 2003-168585 A | 6/2003 |

* cited by examiner

*Primary Examiner*—Douglas W Owens
*Assistant Examiner*—Jae K Kim
(74) *Attorney, Agent, or Firm*—Birch, Stewart, Kolasch & Birch, LLP

(57) ABSTRACT

A highly stable current-mode resonant inverter circuit operates by detecting resonance current in the secondary side circuit. The inverter circuit comprises a step-up transformer with a secondary winding connected to a secondary side circuit with a capacitive component. The leakage inductance and the secondary winding and the capacitive component compose a series resonant circuit. The inverter circuit is configured to detect a current flowing through the secondary winding or capacitive component in the secondary side circuit, and determine a switching timing in response to the detected current. The determined switching timing allows the inverter circuit to oscillate self-excitedly at a resonance frequency of the series resonant circuit.

12 Claims, 44 Drawing Sheets

CURRENT-MODE RESONANT INVERTER CIRCUIT FOR DISCHARGE LAMP

This application claims priority to Japanese Patent Application No. 2005-005410 filed on Jan. 12, 2005.

TECHNICAL FIELD

The present invention is directed to a current-mode resonant inverter circuit for a capacitive light source such as a hot cathode fluorescent lamp, a cold cathode fluorescent lamp (CCFL), an external electrode fluorescent lamp (EEFL), a neon lamp, and other discharge lamps that that have similar characteristics.

BACKGROUND OF THE INVENTION

Recently, surface light sources are being more widely, not only for advertisement and personal computer displays, but also for liquid crystal display television sets and the like.

There is a demand of decreasing the size of an inverter circuit for driving these surface light sources and increasing conversion efficiency. Hereinafter, a description is given for the relation between the recent developments of inverter circuits for cold cathode fluorescent lamps and the invention disclosed in Japanese Patent No. 2733817 (U.S. Pat. No. 5,495,405).

Conventionally, the collector resonant circuit shown in FIG. 19 has been widely used as a classical type of inverter circuit for a cold cathode fluorescent lamp. This is sometimes referred to as a "Royer circuit". However, the Royer circuit is officially defined as a circuit which reverses a switching operation by saturating the transformer. A circuit which performs the reverse operation by using the resonance on the collector side is referred to as "collector resonant circuit" or "collector resonant Royer circuit" as distinguished from the Royer circuit.

A type of inverter circuit for a cold cathode fluorescent lamp, which never uses the resonating method on the secondary side of the circuit, uses the so-called closed magnetic circuit type transformer, which has a small leakage inductance, for the step-up transformer. Under these circumstances, those skilled in the art understand that the so-called closed magnetic circuit type transformer is a transformer that has small leakage inductance. It is advantageous to make the leakage inductance of the step-up transformer in the inverter circuit as small as possible because the leakage inductance causes the output voltage on the secondary side of the transformer to drop.

As a result, under these circumstances, the resonance frequency of the circuit on the secondary side of the transformer is set at a frequency much higher than the operational frequency of the inverter circuit in order not to influence the operational frequency of the inverter circuit. Furthermore, the ballast capacitor Cb is essential to stabilize the lamp current.

Next, FIG. 20 illustrates a type of inverter circuit for a cold cathode fluorescent lamp, which is disclosed in Japanese Laid-Open Patent Publication (Kokai) No. Hei 07-211472. In this type of configuration, the resonance frequency of the circuit on the secondary side is three times as high as the oscillation frequency of the primary side circuit, as shown in FIG. 21. Accordingly, this widely used type of inverter circuit is referred to as the triple resonant circuit. In this case, the leakage inductance of the step-up transformer is favorably made larger to some extent.

As shown in the explanatory diagram as FIG. 22, the oscillation frequency and third-order harmonic of the inverter circuit in FIGS. 20 and 21 are combined to produce a trapezoidal waveform.

The actual current which flows through the cold cathode fluorescent lamp of the triple resonant circuit is represented by the waveform shown in FIG. 23.

The name of the step-up transformer illustrated in the circuit of FIGS. 20 and 21 this case has not been fixed yet. There has been debate about whether or not it should be referred to as a "closed magnetic transformer", which is term used among those skilled in the art. Thus, the name remains uncertain. The problem of how to describe the state in which a larger amount of flux leaks, even though the magnetic circuit structure is closed, has been discussed.

The shape of the transformer used in the so-called triple resonant circuit is flat as shown in FIG. 24. In this transformer, the flux leakage is considerably larger than in a conventional one, although the magnetic circuit structure is closed. Specifically, the transformer has a large leakage inductance.

In any case, the technical idea behind the circuit of FIG. 20 increases the leakage inductance of the step-up transformer to some extent so as to form a resonant circuit between the leakage inductance and the capacitive component Cs formed on the secondary side of the step-up transformer. Also, the resonance frequency is set at a frequency three times as high as the operational frequency of the inverter circuit so as to produce the third-order harmonic in the secondary side circuit (see FIG. 21), thereby making the lamp current waveform trapezoidal (see FIG. 22). In this case, a ballast capacitor C2, which is the ballast capacitor, operates as a part of the resonance capacitor.

As disclosed in Japanese Laid-Open Patent Publication (Kokai) No. Hei 07-211472, this technical idea considerably improves the conversion efficiency of the inverter circuit and furthermore makes the inverter circuit smaller than the step-up transformer. Also, recent and current implementations of a collector resonant inverter circuit for a cold cathode fluorescent lamp is based on the technical idea of the triple resonance, and it would not be an exaggeration to say that the technique is employed in most of the collector resonant inverter circuits which are currently used.

Next, the invention disclosed in Japanese Patent No. 2733817 (U.S. Pat. No. 5,495,405), on which the present invention is based, makes the step-up transformer further smaller and to improve conversion efficiency drastically. The invention of Japanese Patent No. 2733817 helps decrease the size of the inverter circuit in a laptop personal computer and improves conversion efficiency. Particularly, it increases both the step-up transformer leakage inductance further and the capacitive component in the secondary side circuit larger at the same time in the triple resonant circuit. This results in the operational frequency of the inverter circuit to almost coincide with the resonance frequency in the secondary side circuit.

The technique utilizes an effect in which the exciting current flowing through the primary winding of the step-up transformer decreases when the inverter circuit operates at a frequency close to the resonance frequency in the secondary side circuit, thereby improving the power factor as seen from the primary winding side of the transformer and reducing the copper loss of the step-up transformer.

At the time the invention of Japanese Patent No. 2733817 was disclosed, many kinds of driving methods for the primary circuits have been used in connection with the conventional collector resonant circuit. One of these driving methods include a fixed frequency and zero current switching type driving method for performing switching by detecting the zero current through the primary side windings. Each of these series of peripheral techniques is related to the invention, and the usage of the resonance technique of the secondary side circuit in the invention.

Considering the history of changes in inverter circuits for a cold cathode fluorescent lamp, from the viewpoint of the leakage inductance of the step-up transformer, it can be seen that the step-up transformer leakage inductance increases, while at the same time the secondary side circuit resonance frequency decreases, as each new generation of the inverter circuit comes to the forefront, as shown in FIG. 25.

It should be noted that FIG. 25 is an explanatory diagram illustrating the changing relationship between the drive frequency $f_0$ of the inverter circuit and the resonance frequency fr in the secondary side circuit with each new generation.

Improving the step-up transformer and appropriately selecting the drive frequency thereof achieve the objectives of miniaturizing the inverter circuit and improving the conversion efficiency of the inverter circuit. Regarding this matter, FIG. 26 is an explanatory diagram illustrating the improved conversion frequency obtained by the invention disclosed in Japanese Laid-Open Patent Publication No. 2003-168585 by the inventor of the present invention (U.S. Pat. No. 6,774,580-B2). Particularly, the diagram of FIG. 26 illustrates a scheme for improving the power factor as seen from the driving side, in which the horizontal axis indicates frequency, and θ indicates the phase difference between the voltage and current of the primary winding of the step-up transformer, showing that power factor is improved as θ becomes closer to zero. This scheme for promoting such conversion efficiency as seen from the driving side is disclosed in more detail below.

On the contrary, as shown in U.S. Pat. No. 6,114,814-B1 and Japanese Laid-Open Patent Publication No. Sho 59-032370, those skilled in the art consistently have advocated the technical idea that a high conversion efficiency inverter circuit is achieved by the zero current switching method.

This technical idea, however, does not consider the improvement power factor effect of the step-up transformer. Therefore, this technical idea is incorrect because the high efficiency is actually due to the reduction of heat generated in the switching transistor.

The reason will be described in detail below.

The zero current switching method is one power control method of the inverter circuit. A typical example thereof is a zero current switching type circuit as shown in FIG. 27, which is disclosed in U.S. Pat. No. 6,114,814-B1 and Japanese Laid-Open Patent Publication No. Sho 59-032370. The inventor of the present invention also discloses a similar technique in Japanese Laid-Open Patent Publication No. Hei 08-288080. The technique is described based on the U.S. Pat. No. 6,114,814-B1 as follows.

U.S. Pat. No. 6,114,814-B1 shows explanatory diagrams illustrating the operation of the conventional zero current switching type circuit shown in FIG. 11 of that patent (which is shown as FIG. 28 in the present specification), wherein A, B show a case in which no power control is performed; C, D a case in which power control is performed; E, F a case in which zero current switching operation is tried in a state that a voltage effective value advances in phase with respect to a current effective value. Also, in FIG. 12 of the abovementioned U.S. Pat. No. 6,114,814-B1 is shown as FIG. 29 of the present specification, wherein G, H show one exemplary control which is not zero current switching operation.

In FIG. 28, A shows the voltage of the primary winding of the transformer when drive power is at maximum, and B shows the current flowing through the transformer primary winding in this case. When the zero current switching method is used, the timing at which the current becomes zero is detected so as to switch on the driving means. When power is at maximum, specifically when no power control is performed, the duty ratio is at 100% and there is no phase difference between the effective value of the voltage phase and effective value of the current phase supplied to the transformer primary winding. In this condition the power factor is favorable.

Next, C of FIG. 28 shows the voltage across the transformer primary winding when the duty ratio (circulation angle) is decreased so as to control drive power, and D shows the current flowing through the transformer primary winding in this case. According to C and D of FIG. 28, the switching transistor of the driving method is turned on at the timing at which the current becomes zero. On the contrary, it is not at zero current timing when the switching transistor is turned off. In this case, there is a phase difference between the effective value phase of the voltage applied to the transformer primary winding and the phase of the current flowing through the transformer primary winding. As a result, the power factor is unfavorable in this case.

In FIG. 29, G shows a case in which power is controlled at a similarly limited duty ratio so that the effective value phase of the voltage across the transformer primary winding is in phase with the phase of the current flowing through the transformer primary winding, without employing the zero current switching method. In this case, the power factor is actually favorable as seen from the transformer primary winding side and the heat generated in the step-up transformer is small. However, this is not the result of the use of the zero current switching method.

Here, the technical idea that the zero current switching method makes higher conversion efficiency of the inverter circuit is contradicted by a discovery of the inventor of the present invention. In the technical idea of the invention disclosed in U.S. Pat. No. 6,114,814-B1, zero current switching method is eliminated in the state shown in G, H of FIG. 29, resulting in an increase in the conversion efficiency of the inverter circuit.

It should be noted that in E, F of FIG. 29 are explanatory diagrams illustrating a case in which zero current switching operation is tried in a state that a voltage effective value advances in phase with respect to a current effective value, and G, H of FIG. 29 are explanatory diagrams showing one exemplary type of control which is not zero current switching operation.

According to the comparative experiments conducted by the inventor of the present invention, however, the inverter circuits obtain clearly higher conversion efficiency by the control method of G, H of FIG. 29 than by the control method of C, D of FIG. 28.

Consequently, the theory that the zero current switching method makes the inverter circuit achieve a higher conversion efficiency is wrong.

The background against which such a misunderstanding has occurred is as follows.

Using the zero current switching method only when no power control is performed, there is necessarily no phase difference between the voltage phase and current phase of the primary winding of the step-up transformer. Therefore, the power factor of the step-up transformer is improved; the current flowing through the transformer primary winding decreases; and the current flowing through the switching transistor also decreases to a minimum. As a result, the heat generated in the step-up transformer primary winding and the heat generated in the switching transistor decrease, thereby improving the conversion efficiency of the inverter circuit. This is taken, by mistake, to mean that the zero current switching method brings high efficiency.

In the state shown as FIGS. 11A and 11B in U.S. Pat. No. 6,114,814-B1, during which no power control is performed, the operational state thereof is equivalent to the standard current-mode resonant operational state. Specifically, it is not the zero current switching method, but rather the conventional current resonant type circuit that brings the inverter circuit high efficiency.

A current-mode resonant inverter circuit is known for lighting a hot cathode fluorescent lamp. For example, the circuit shown in FIG. 30 is generally used. In such a current-mode resonant circuit, no dimmer means are provided in its basic circuit structure. Thus, when the light output is controlled in the current-mode resonant circuit, a DC-DC converter circuit is provided at a preceding stage.

FIG. 31 is an exemplary dimmer circuit of an inverter circuit for a cold cathode fluorescent lamp which combines a conventional current-mode resonant circuit, a DC-DC converter circuit at a preceding stage thereof, and the leakage flux transformer invented by the same inventor of the present invention (hereafter "the present inventor"). In this example, the DC-DC converter circuit comprises a transistor Qs, an inductance Lc, a diode Ds, and capacitor Cv.

A scheme of improving the current-mode resonant circuit itself for light control has also been proposed. FIG. 32 shows the dimmer circuit previously disclosed by the present inventor in Japanese Laid-Open Patent Publication No. Hei 08-288080, in which, in a prescribed period of time after timer circuits 10, 11 detect zero current, a frequency control circuit 12 turns off switching elements 2, 3. The timer circuits 10, 11, which are RS flip-flops, are set at zero current and reset after a prescribed period of time. In this scheme, light is controlled by the method in which, after the switching means is turned on by detecting zero current, the switching means is turned off.

A similar scheme is disclosed in FIG. 9 in U.S. Pat. No. 6,114,814-B1. That is the circuit diagram shown in FIG. 33, in which an RS flip-flop 172 is set at zero current and reset after a prescribed period of time. Both in U.S. Pat. No. 6,114,814-B1 and in Japanese Laid-Open Patent Publication No. Hei 08-288080, zero current is detected so as to turn on the switching means and to set the RS flip-flop at the same time, followed by resetting after a prescribed period of time so as to turn off the switching means. Both provide a dimmer function to the switching means in the current-mode resonant circuit, characterized in that the current delays in phase with respect to the voltage effective value when controlling light. They are completely the same technical ideas and their achievement methods are almost the same.

The present inventor himself has confirmed that, if light is controlled based on the invention disclosed in Japanese Laid-Open Patent Publication No. Hei 08-288080, when a cold cathode fluorescent lamp or hot cathode fluorescent lamp is controlled so as to be considerably dim, a larger current flows through the transistor of the switching means thereby generating heat.

In either case, since high efficiency in the inverter circuit is clearly due to the current-mode resonant type, the present inventor has disclosed the current-mode resonant inverter circuit for a discharge lamp as FIG. 34 in Japanese Laid-Open Patent Publication No. 2004-318059 (invented by the present inventor).

The major conventional current-mode resonant circuit is the half-bridge type, and at the same time, for current detecting means, a current transformer is provided immediately after the half-bridge output so as to detect current. This is known as a lighting device for a hot cathode fluorescent lamp. FIG. 35 shows one example of the inverter circuit applied in order to light a cold cathode fluorescent lamp.

FIG. 36 shows the voltage applied to the primary winding of the step-up transformer when driving a step-up circuit for a cold cathode fluorescent lamp in a conventional current-mode resonant circuit. FIG. 36 is an explanatory diagram illustrating the state of the voltage and current of the step-up transformer primary winding when driving the step-up transformer by the conventional current-mode resonant circuit. The voltage at the half-bridge output stage is applied to the step-up transformer primary winding without change. This voltage is set to VT1. In this case, VT1 creates a rectangular waveform. The current flowing through the step-up transformer primary winding is set to IT1. Switching transistors Q1, Q2 are turned on/off depending on the phase of IT1.

Next, to provide power control function for the current-mode resonant circuit current, a circuit called "zero current switching circuit" is available. However, when power is controlled by the zero current switching method disclosed in Japanese Laid-Open Patent Publication No. Sho 59-032370 so as to control a cold cathode fluorescent lamp, the power factor is not very favorable. Furthermore, since the half-bridge configuration cannot respond to low supply voltage, it is difficult to take full advantage of the power factor improvement effect disclosed in Japanese Patent No. 2733817 (U.S. Pat. No. 5,495,405).

Power factor becomes worse when power is controlled by the zero current switching circuit for the following reason.

In the conventional zero current switching circuit shown in FIG. 33, the relation between the voltage and current given to the primary winding of step-up transformer is exemplarily shown in FIG. 37. The current on the primary winding side does not create such an exemplary sine wave in practice. The voltage waveform rises by detecting the zero point of the current. The ON timing of the switching means is at zero current, but the OFF timing thereof is not at zero current.

The voltage waveform converted into the effective value is shown with a broken line. As can be seen from FIG. 37, the current delays in phase with respect to the voltage effective value. This means that the power factor is poor. With the zero current switching circuit, idle current (reactive current) increases when power is controlled, thereby increasing copper loss in the step-up transformer primary winding, so that the conversion efficiency of the inverter circuit becomes worse.

Next, a description is given for the reason why the power factor decreases using the zero current switching method with reference to monographs. When using the zero current switching method, power factor is poor particularly at a narrower duty ratio as shown in FIG. 38. This is because the current is considerably delayed in phase with respect to the voltage.

A description is given in further detail as follows.

FIG. 39 shows the relation between delay angle and circulation angle (duty ratio), as to how considerably the current waveform delays in phase with respect to the voltage effective value waveform, which is a simple inverse proportional relation.

FIG. 39 calculates how the voltage effective value phase and the current phase change along with a change in duty ratio. It is shown, for example, when the duty ratio is 25%, the delay angle of the current with respect to the voltage is 67.5 deg. From FIG. 39, the phase delay of the current with respect to the voltage when the duty ratio (duty ratio) is set at 25% can be obtained as about 67.5 deg.

As shown in FIG. 40, in the zero current switching circuit, the intersection of the frequency corresponding to the delay angle and the phase characteristic becomes the operational frequency of the inverter circuit. In the zero current switching circuit, therefore, the operational frequency deviation is unavoidable when power is controlled.

Next, consideration is given for power factor in FIG. 41 and FIG. 42.

In FIG. 41, if the load current converted on the primary side is set to a, the exciting current is represented by tan θ, and the current through the transformer primary winding is represented by 1/cos θ (reciprocal of power factor).

FIG. 42 is an explanatory diagram showing the relation among the load current converted on the transformer primary side, the exciting current, and the current through the transformer primary winding for considering power factor. FIG. 42 illustrates that a large delay angle allows a larger exciting current thereby increasing idle current.

In FIG. 42, the combined current ratio represents 1/cos θ (reciprocal of power factor). Taking the current delay in phase with respect to the voltage effective value as a current delay angle θ, the figure shows its relation with 1/cos θ (reciprocal of power factor). How much larger the current flowing through the transformer primary winding is than the load current is considered in FIG. 42 as follows. If the current delays by 67.5 deg. in phase with respect to the voltage effective value, 2.61-times larger current flows through the transformer primary winding than in a case in which there is no delay. Consequently, the power factor becomes extremely worse, and more heat is generated in the transformer primary winding due to increase in copper loss. Also, for the same reason, more heat is generated in the transistor of the switching means.

Specifically, when power is controlled using the zero current switching method, if using the duty ratio control method disclosed in each of U.S. Pat. No. 6,114,814-B1, Japanese Laid-Open Patent Publication No. Hei 08-288080 and Japanese Laid-Open Patent Publication No. Sho 59-032370 for power control, the following conclusion is obtained from a viewpoint of improving power factor.

In a state that the duty ratio is large, specifically, in a state that the current slightly delays in phase with respect to the voltage effective value, the conversion efficiency of the inverter circuit is favorable. However, when the duty ratio is small, there are long current delays in phase and consequently, the power factor becomes worse, and a larger current flowing through the transformer primary winding makes the inverter circuit conversion efficiency worse. Particularly, as the duty ratio becomes smaller thereby delaying the current in phase closer to 90 deg., idle current increases rapidly thereby making the efficiency worse significantly.

Specifically, in such a state, when the zero current switching method is applied to a laptop personal computer, if an AC adapter is used, the supply voltage becomes highest. Under these conditions, when power is restricted so as to make a liquid crystal display panel darker or the like, the current delays longest in phase. In this case, significant heat is generated in the inverter circuit in practice.

Furthermore, there is also a problem that the operational frequency deviation of the inverter circuit is unavoidable when current is controlled by the zero current switching method.

What is clear is that it is not always necessary to implement power control according to the technical idea of zero current switching in order to achieve a high-efficiency inverter circuit. On the contrary, the idea is damaging. In order to configure an inverter circuit with good conversion efficiency, the above technical idea has to be eliminated and a method which achieves the best power factor in the step-up transformer primary winding has to be applied.

As driving means for carrying out the technical subject matter described in Japanese Patent No. 2733817 (U.S. Pat. No. 5,495,405), separately excited driving means are often employed with the fixed frequency oscillation circuit composed of a capacitance C and a resistor R as an oscillation circuit. In this case, however, there are sometimes fluctuations in parasitic capacitances caused by assembly methods for mass production, thereby deviating the secondary side circuit resonance frequency. Alternatively, there are sometimes fluctuations in component values thereby deviating the drive frequency of the drive circuit on the primary side. In such situations, constant driving at the optimum resonance frequency at which the power factor is improved is difficult.

If the resonance frequency of the secondary side circuit is shifted away from the drive frequency of the primary side circuit, the efficiency of the inverter circuit becomes extremely worse. Therefore, when using fixed-frequency separately-excited driving means, the Q value of the resonant circuit of the secondary side circuit is lowered so as to obtain broad resonance characteristics thereby responding to frequency deviation. For such a reason, it is difficult to raise the Q value of the secondary side resonant circuit in the fixed-frequency separately-excited driving means.

When trying to drive the secondary side resonant circuit with a low Q value by a conventional current-mode resonant circuit, continuous oscillation becomes difficult. Therefore, consideration has to be given so as not to make the Q value too low when driving by the current-mode resonant type.

However, in a step-up transformer for a general cold cathode fluorescent lamp, the Q value of the secondary side resonant circuit is never set to high. Specifically, it is because the technical idea of setting the Q value to high is not known among those skilled in the art at the time of filing for the application of the present invention.

Consequently, in order to respond to a commercial step-up transformer for fixed-frequency drive, the value of the coupling capacitor Cc on the primary side is decreased so as to resonate with the leakage inductance of the step-up transformer on the primary winding side, thereby making the coupling capacitor Cc involved in the resonance to ensure continuous oscillation with stability. However, the measures involve problems that heat is generated easily in the step-up transformer.

SUMMARY OF THE INVENTION

In order to achieve the above objectives, the present invention is to provide a high-efficiency inverter circuit by providing the current-mode resonant type which brings high conversion efficiency in using power, reflecting the technical subject matter in Japanese Patent No. 2733817 (U.S. Pat. No. 5,495,405).

Also, even when power is restricted, the present invention, without adversely affecting the power factor improvement effect, is to provide a high conversion efficiency inverter circuit which reflects the technical subject matter in Japanese Patent No. 2733817 (U.S. Pat. No. 5,495,405). Specifically, power is controlled without making the power factor worse by keeping the transformer primary side, the voltage and the current in phase when controlling power.

Specifically, current detecting means of the current-mode resonant inverter circuit detects the current flowing through the resonance capacitor of the resonant circuit or the current flowing through the secondary winding of the transformer so that the inverter circuit responds to a high Q value and the inverter circuit also responds to a low Q value stably.

Also, when power is controlled, by employing a method in which the phase difference between the phase of the drive voltage effective value as seen from the step-up transformer primary winding side and the phase of the flowing current is narrowed, driving with a good power factor is achieved.

DESCRIPTION OF THE PREFERRED EMBODIMENTS

Figure 2:
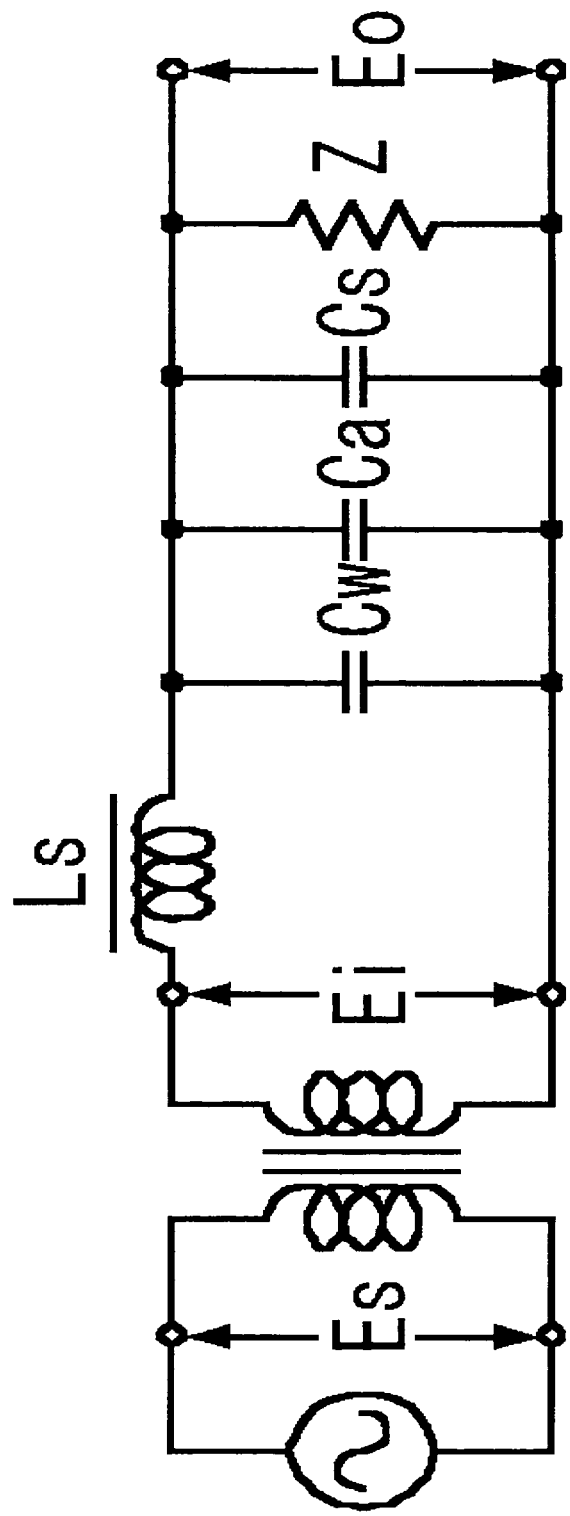
FIG. 2 is an equivalent circuit diagram showing one embodiment of the resonance circuit according to the present invention.

First, a resonant circuit according to an exemplary embodiment of the present invention is shown in FIG. 2. In FIG. 2, capacitive components Cw, Ca and Cs in the secondary side circuit, whose capacitances are combined so as to make up the resonance capacitance, compose the secondary side resonant circuit of the step-up transformer together with the leakage inductance Ls. In this case, the reference character Z denotes the impedance of a discharge lamp. In this case, the equation Ei=Es·k·N2/N1 is true, in which k means coupling coefficient, and N1, N2 mean the number of turns of the transformer primary and secondary windings.

The oscillation frequency of the inverter circuit is determined by the resonance frequency of the secondary side circuit. The resonance frequency is set to fr:

$$f_r = \frac{1}{2\pi\sqrt{L_s \cdot (C_W + C_a + C_s)}}$$

The oscillation frequency of the current-mode resonant circuit in the present invention becomes the above frequency or a frequency slightly lower by the work of a parallel loaded serial resonance circuit.

Conventionally, taking the secondary side circuit when being driven by fixed-frequency separately-excited means, in the example of a 14-inch-sized laptop personal computer, the impedance Z of the discharge lamp is about 100 kΩ, and the operational frequency of the inverter circuit is about 60 kHz. Under these exemplary conditions, the appropriate value of the leakage inductance Ls is 240 mH to 280 mH and the appropriate value of the secondary side capacitance is 25 pF to 30 pF.

Although these parameters change as appropriate depending on the size, system or the like of a liquid crystal display backlight or surface light source, the above equation is applicable without change.

Figure 1:
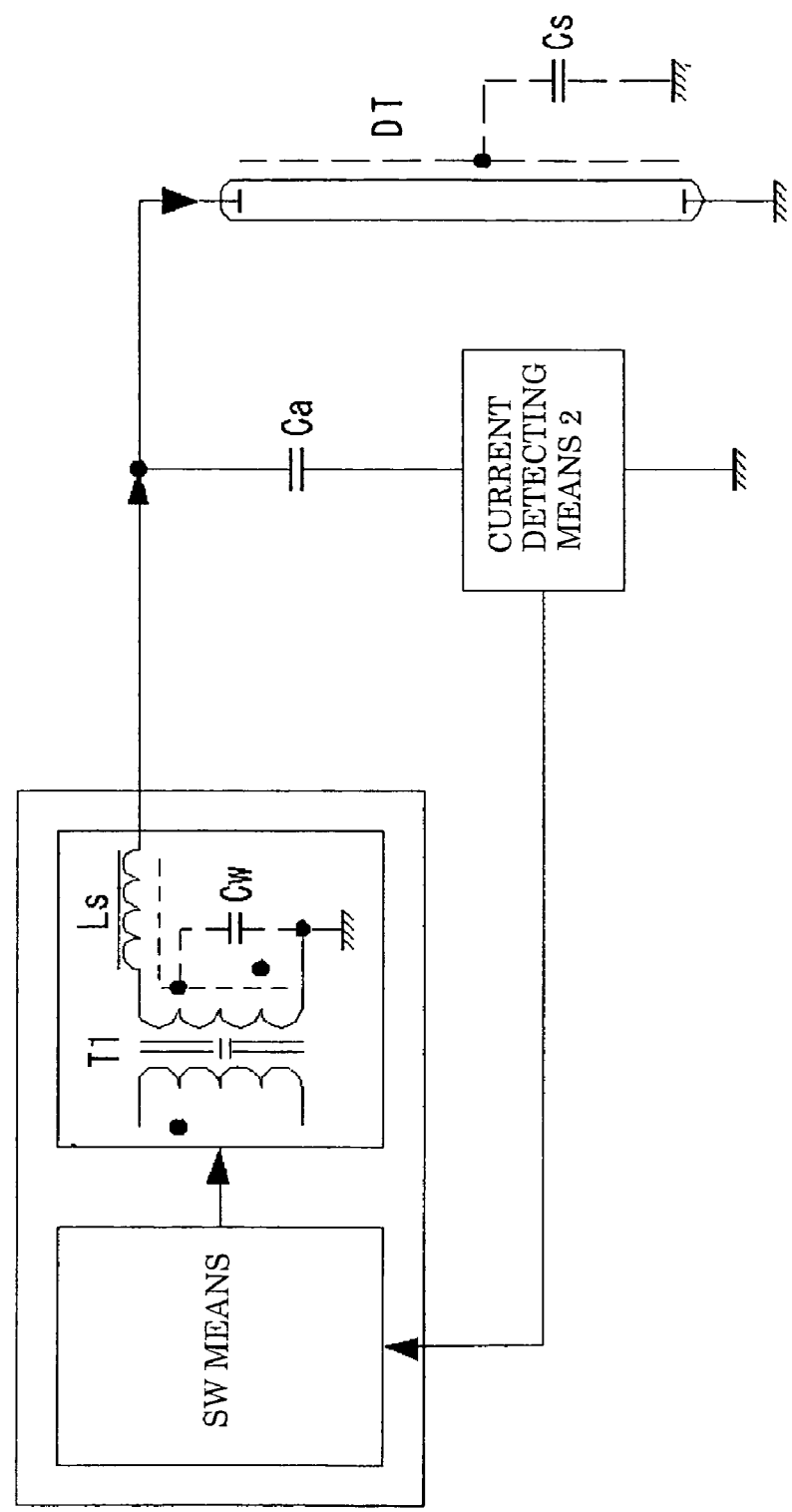
FIG. 1 is a circuit structural diagram showing one embodiment in which current detecting means of a current-mode resonant circuit according to the present invention is on the secondary side of a step-up transformer.

FIG. 1 is one embodiment in which the current detecting means of the current-mode resonant circuit is on the secondary side of the step-up circuit transformer. In this embodiment, T1 denotes a step-up transformer, Ls is leakage inductance of the secondary winding and Cw is distributed capacitance of the secondary winding. Ca denotes an auxiliary resonance capacitor to be added to the secondary side circuit as appropriate and Cs is parasitic capacitance around a discharge lamp.

In this example, the GND of the resonance capacitor Ca is connected through the current detecting means so that the voltage generated in the current detecting means is used for switching the switching means. For instance, the switching means may be any one of the following types of switching means of an inverter circuit for a cold cathode fluorescent lamp: a half-bridge type, a full-bridge, a center-tap type, and a switched-snubber type are applicable.

The current detecting means may be a resistor, or a current transformer or current detecting element with an amplifier circuit. For purposes of the invention, the operation and effect of these alternative types of current detecting means are the same.

Figure 43:
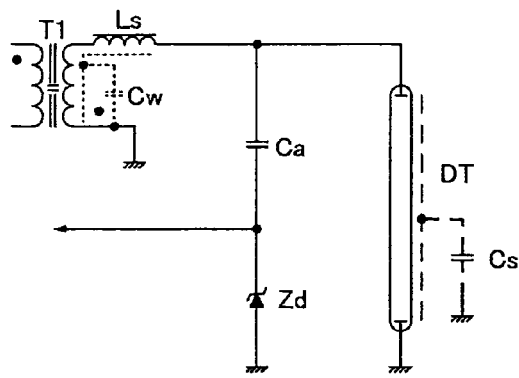
FIG. 43 is a circuit structural diagram showing a case in which a Zener diode is used as current detecting means in the circuit structure shown in FIG. 1.

Also, a Zener diode may be used as current detecting means as shown in FIG. 43.

Figure 44:
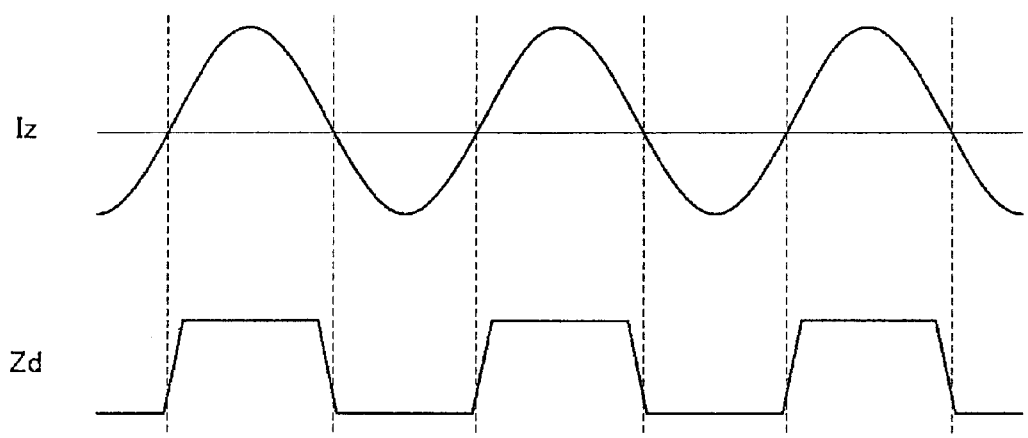
FIG. 44 is a diagram showing the relation between the current Iz flowing through the Zener diode and the generated voltage Zd in the circuit structure shown in FIG. 43.

In this case, the relation between current Iz flowing through the Zener diode and the generated voltage Zd is shown in FIG. 44. If the breakdown voltage of the Zener diode is about 5V, a synchronizing signal close to a digital waveform is easily obtained.

Figure 45:
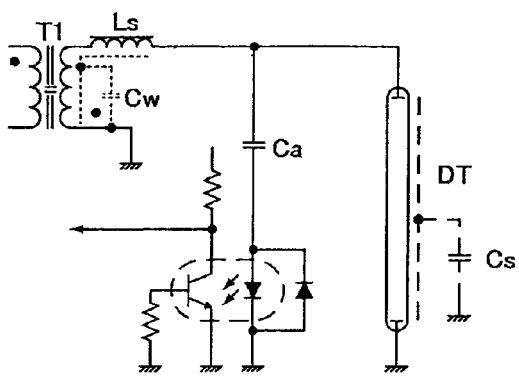
FIG. 45 is a circuit structural diagram showing a case in which a photocoupler is used instead of the Zener diode in the circuit structure shown in FIG. 43.

It should be noted that a photocoupler may be used instead of the Zener diode based on the same technical idea as shown in FIG. 45.

Figure 3:
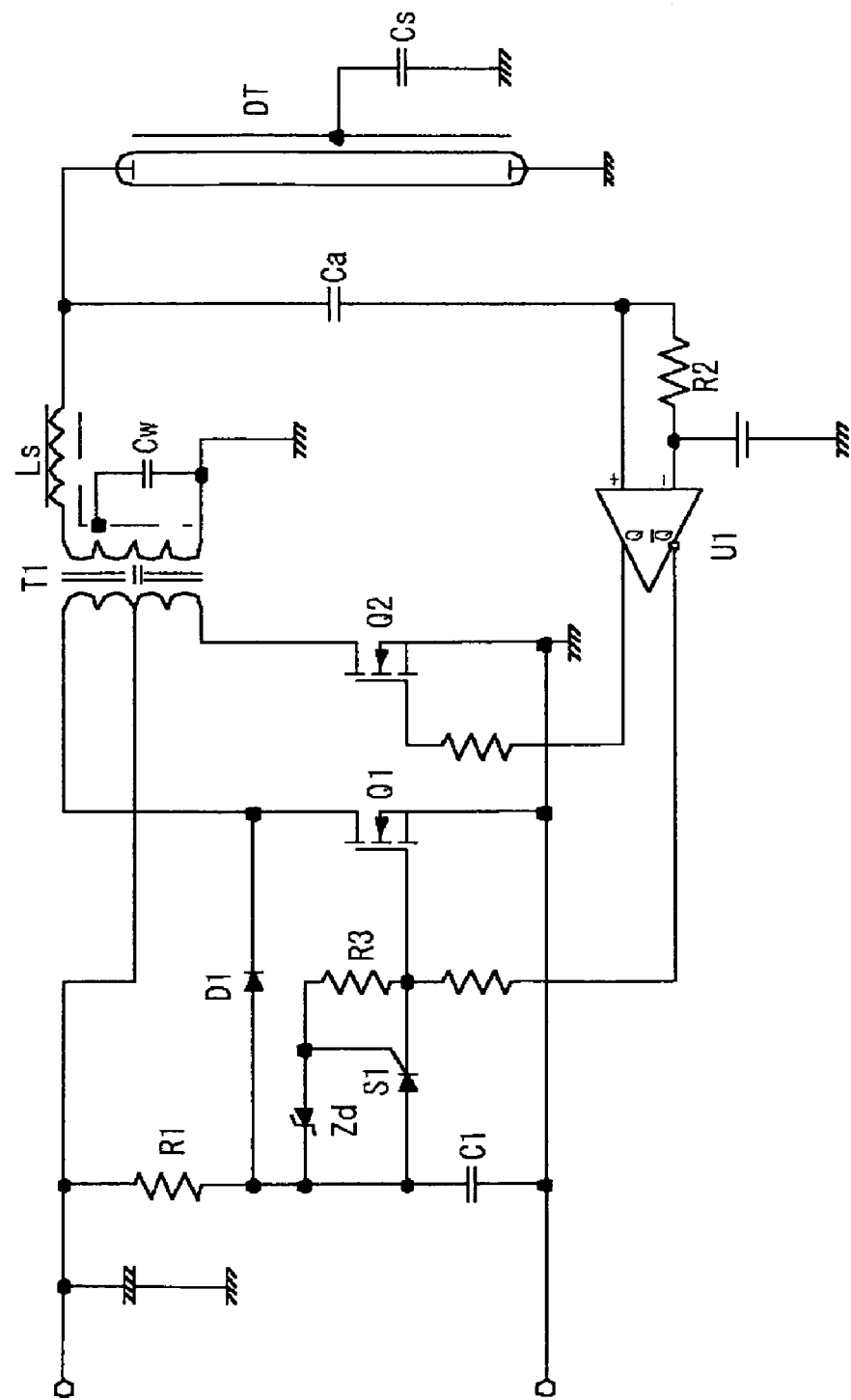
FIG. 3 is a circuit diagram showing one concrete embodiment in which the current-mode resonant circuit according to the present invention is composed of a center-tap type circuit.

FIG. 3 is one concrete embodiment which is composed of a center-tap type circuit.

The primary winding of the step-up transformer T1 has a center tap, and the center tap is connected to the power source.

Other two terminals are connected to the transistors Q1, Q2, which operate as switching means, through the GND. This embodiment, which is basically a current-mode resonant circuit, requires some kind of starting means. In the figure, the starting means comprises a resistor R1, a capacitance C1, a thyristor S1, a diode D1 and a Zener diode ZD. The reference character Ca is an auxiliary resonance capacitor added for the purpose of adjusting resonance frequency, and R2 is current detecting means for detecting current flowing through the Ca. The resonance current flows not only through the resonance capacitor Ca but also the distributed capacitance Cw and the parasitic capacitance Cs. Since the capacitive components are equivalently connected to the resonance capacitor Ca in parallel, the current flowing through the resonance capacitor Ca and the resonance current flowing through all the capacitive components are in phase. Therefore, by detecting the current flowing through the resonance capacitor Ca, the phase of the resonance current can be detected accurately. The reference character U1 denotes a comparator for switching the transistors Q1, Q2 depending on the current detected by the resistor R2.

Figure 4:
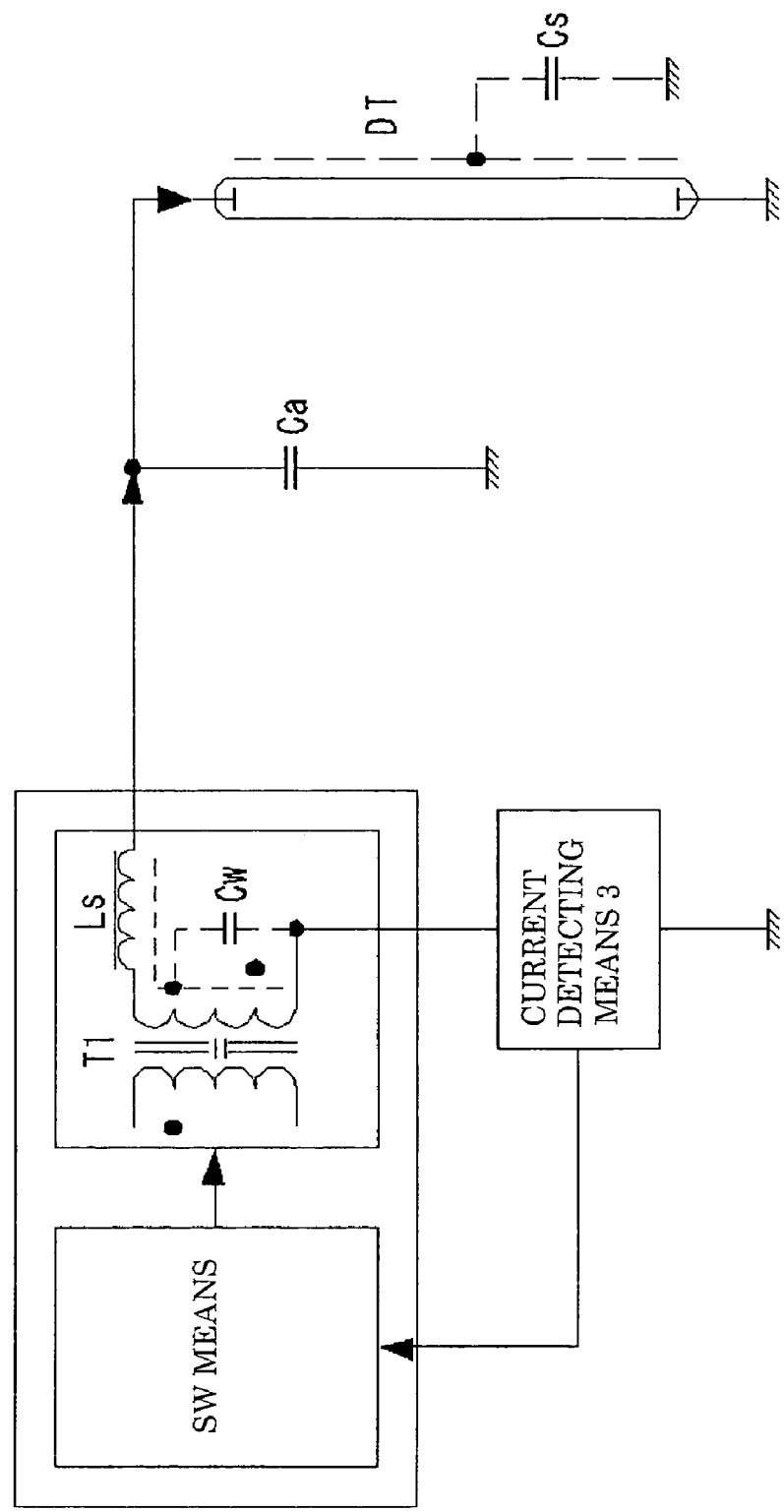
FIG. 4 is a circuit structural diagram showing one embodiment in which switching timing of switching means is determined by the current detecting means of the current-mode resonant circuit according to the present invention detecting a detection signal of the current flowing through the secondary winding of a step-up transformer.

Next, the current detecting means shown in FIG. 4 detects the current flowing through the secondary winding of the step-up transformer, and the switching timing of the switching means is determined by its detection signal.

Figure 46:
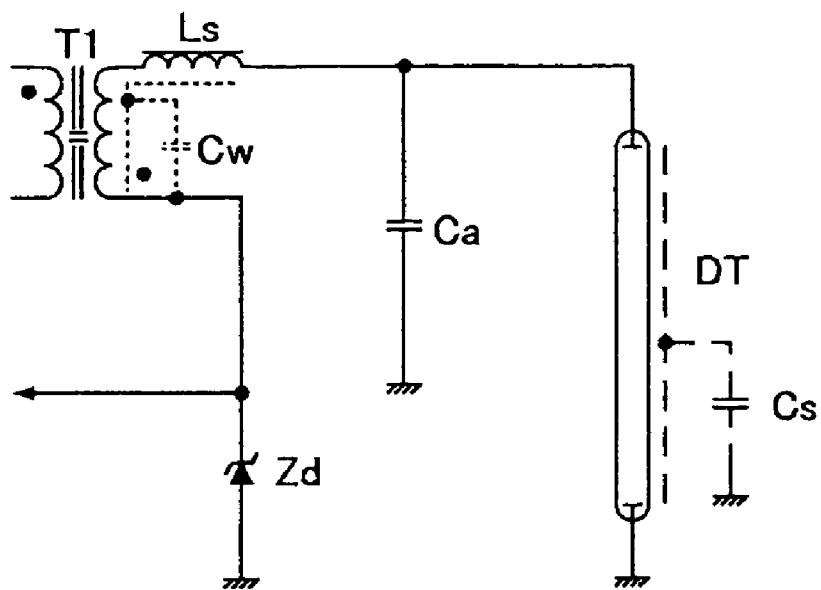
FIG. 46 is a circuit structural diagram showing a case in which the current detecting means shown in FIG. 4 is composed of a Zener diode.

The current detecting means, similarly as in FIG. 43, may be composed of a Zener diode. FIG. 46 shows this case.

Figure 47:
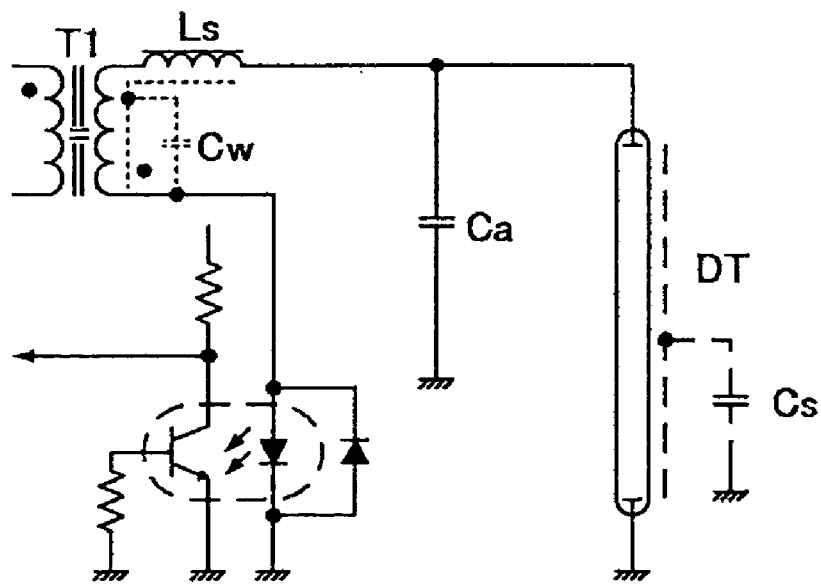
FIG. 47 is a circuit structural diagram showing a case in which a photocoupler is used instead of the Zener diode in the circuit structure shown in FIG. 46.

Hereinafter, similarly, it is needless to say that the current detecting means may be composed of a photocoupler (see FIG. 47).

Figure 5:
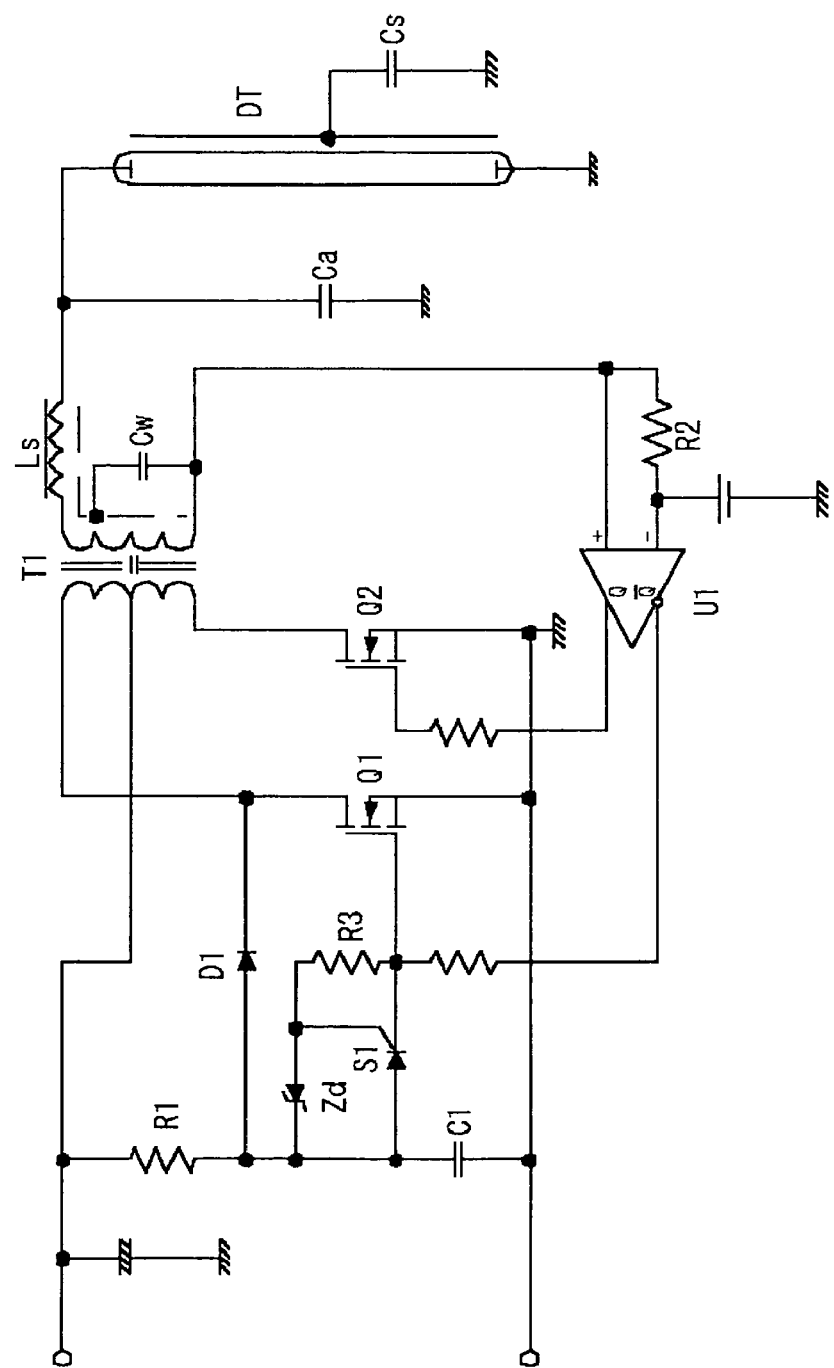
FIG. 5 is a circuit diagram showing another concrete embodiment in which the current-mode resonant circuit according to the present invention is composed of a center-tap type circuit.

FIG. 5 is one concrete embodiment which is composed of a center-tap type circuit.

Since any one of the above circuits has no power control means, the voltage of the power source just has to be controlled in order to control the lamp current of a discharge lamp.

Figure 7:
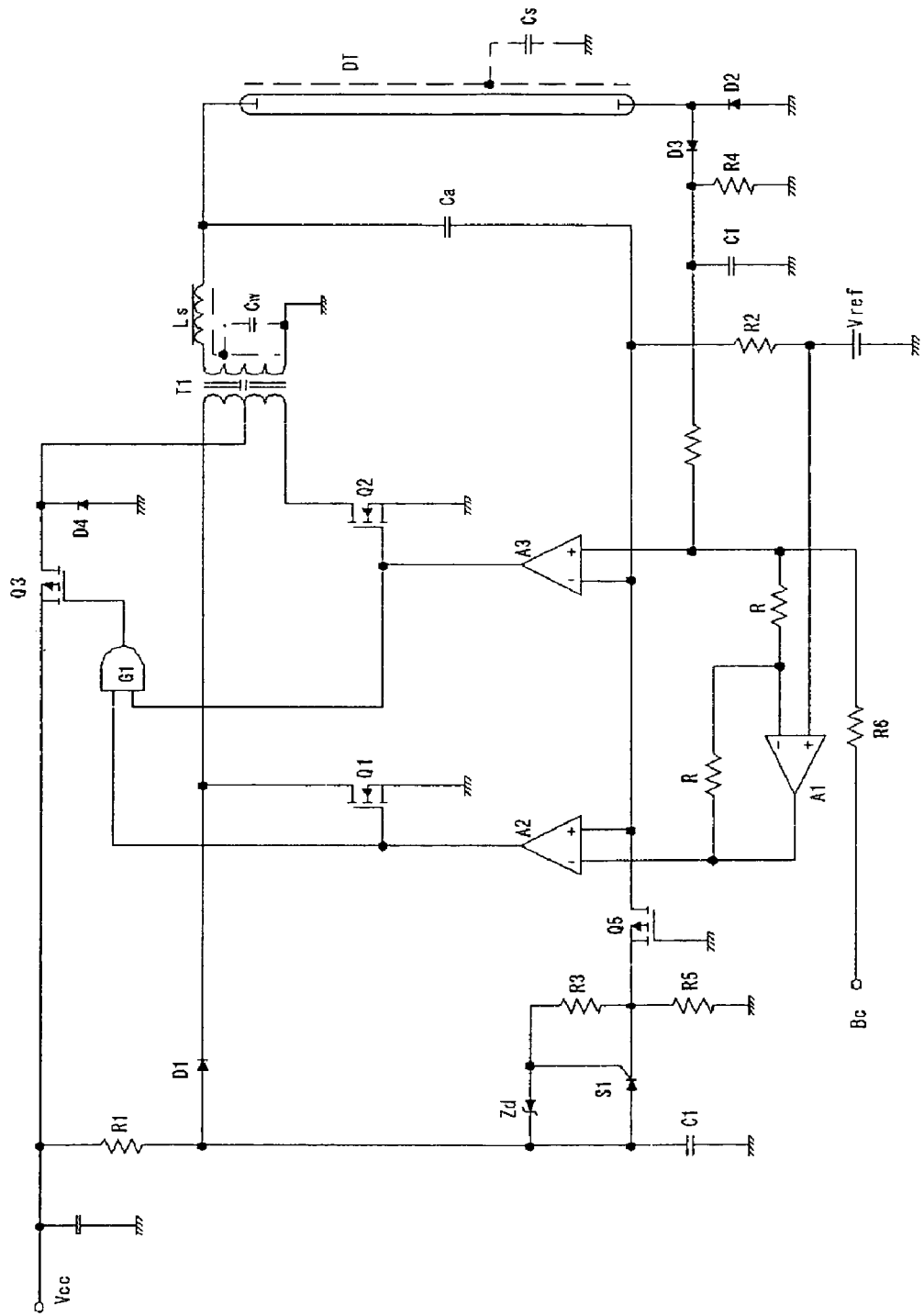
FIG. 7 is a circuit structural diagram showing another embodiment in which the current detecting means of the current-mode resonant circuit according to the present invention is on the secondary side of the step-up transformer.
Figure 9:
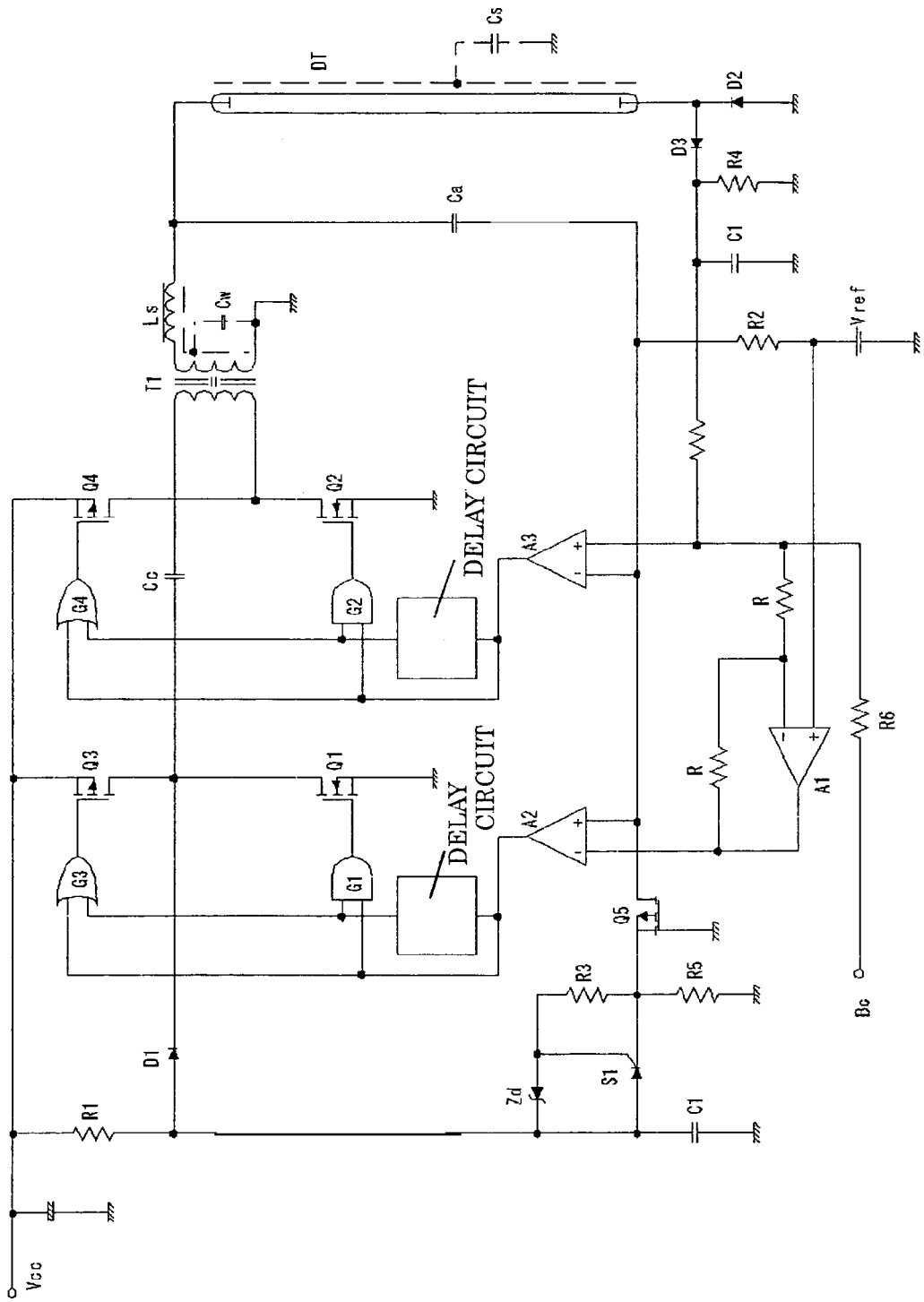
FIG. 9 is a circuit diagram showing one concrete embodiment in which the current detecting means of the current-mode resonant circuit according to the present invention is composed of a full-bridge type circuit.

Accordingly, a method is hereinafter given in which power is controlled by using the voltage generated in the current detecting means. FIG. 7 shows center-tap type current detecting means and FIG. 9 shows full-bridge type current detecting means. The current detecting means in this case includes conventional current-mode resonant current detecting means.

Figure 6:
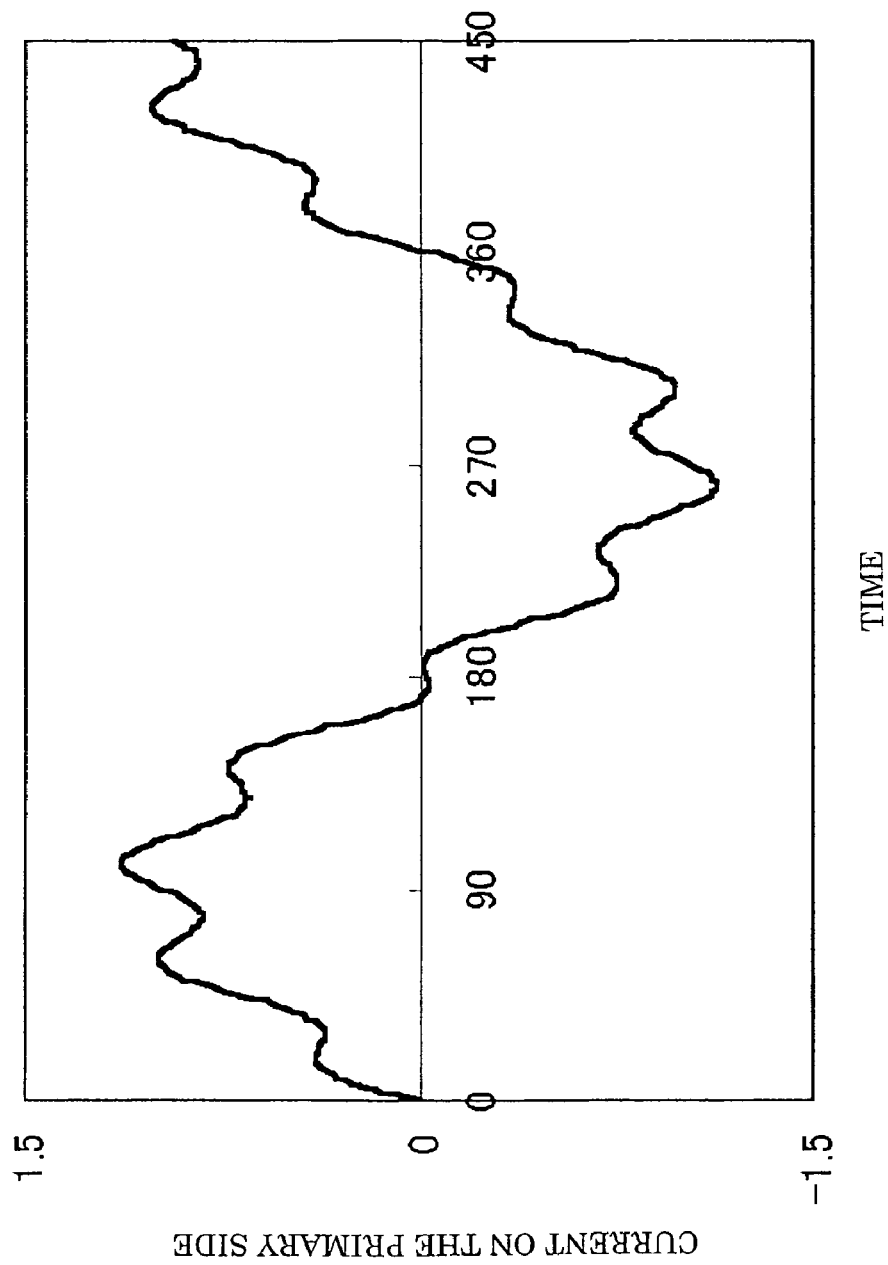
FIG. 6 is a waveform chart showing an undesired resonance current which sometimes occurs in the primary winding of the step-up transformer for a cold cathode fluorescent lamp.
Figure 36:
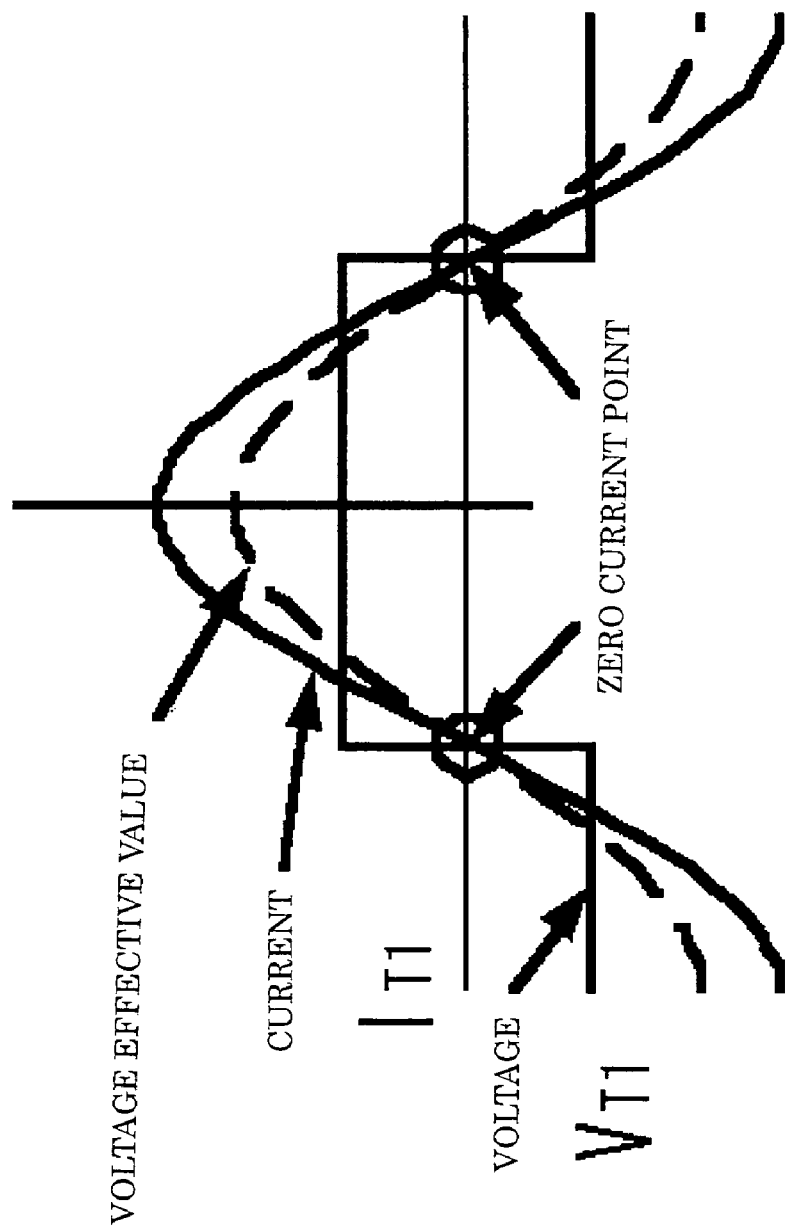
FIG. 36 is an explanatory diagram showing that switching is performed at the zero current point in the conventional current-mode resonant circuit.
Figure 37:
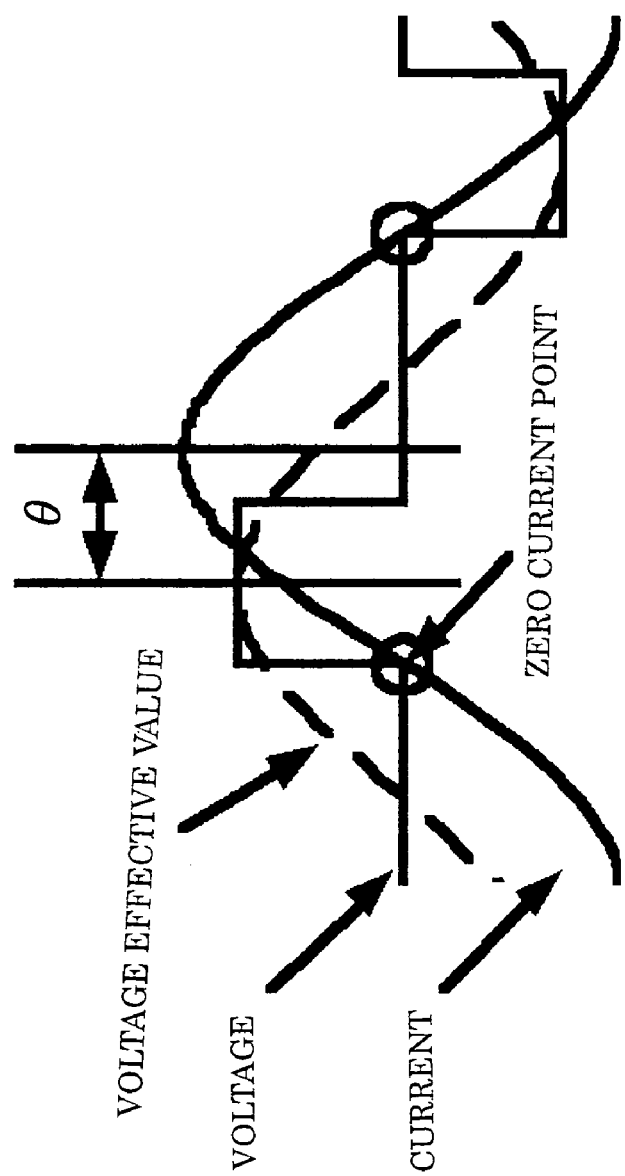
FIG. 37 is a phase diagram exemplarily showing the relation between the voltage and current applied to the step-up transformer primary winding in the conventional zero current switching circuit when power is large.
Figure 38:
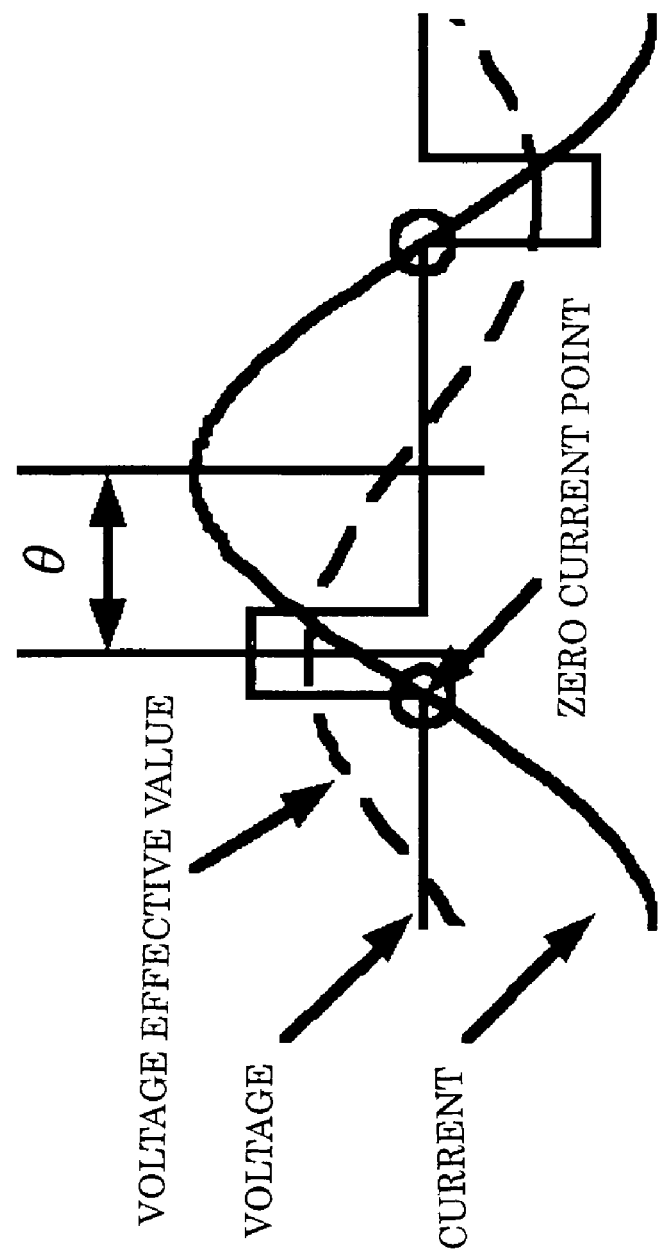
FIG. 38 is a phase diagram exemplarily showing the relation between the voltage and current applied to the step-up transformer primary winding in the conventional zero current switching circuit when power is small.
Figure 39:
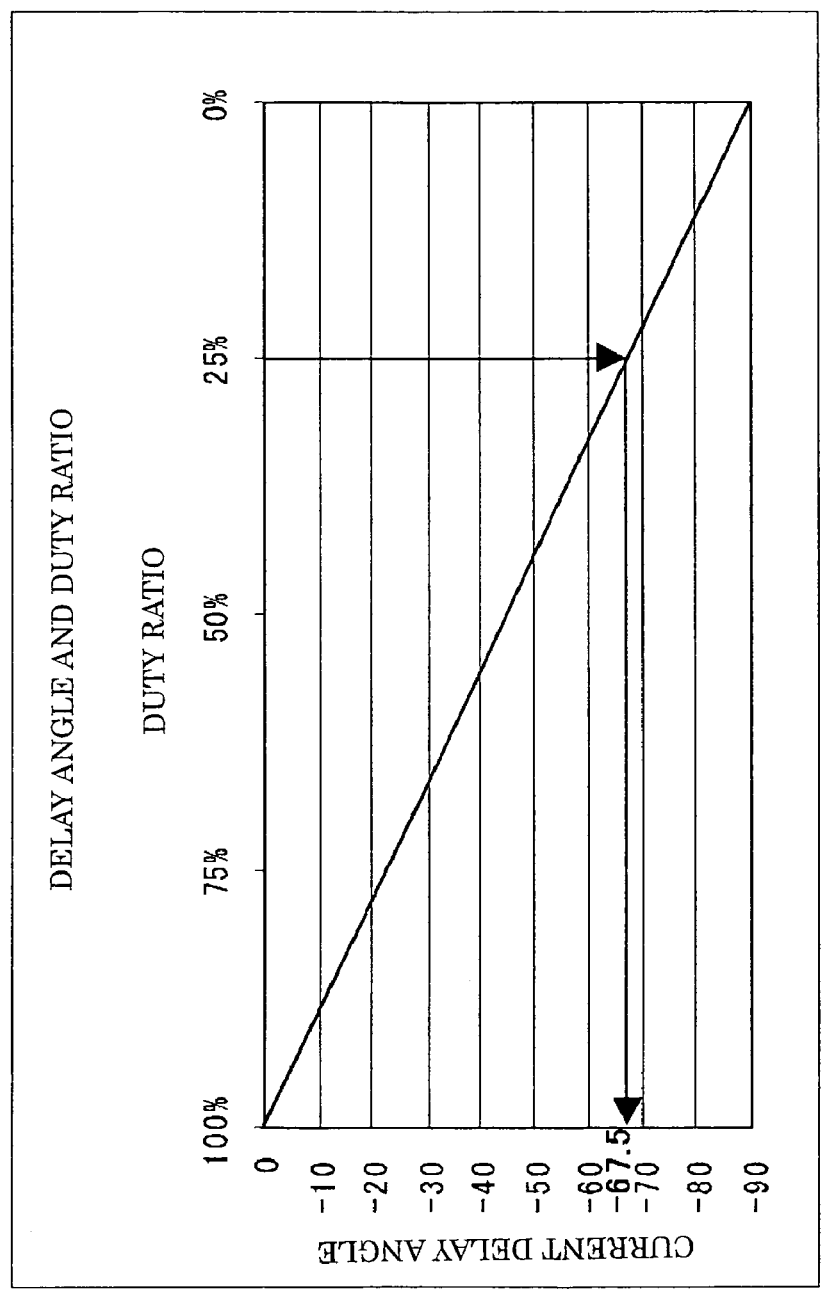
FIG. 39 is an explanatory diagram showing the relation between delay angle and duty ratio, as to how long time the current waveform delays in a phase with respect to the voltage effective value, in the conventional zero current switching circuit.
Figure 40:
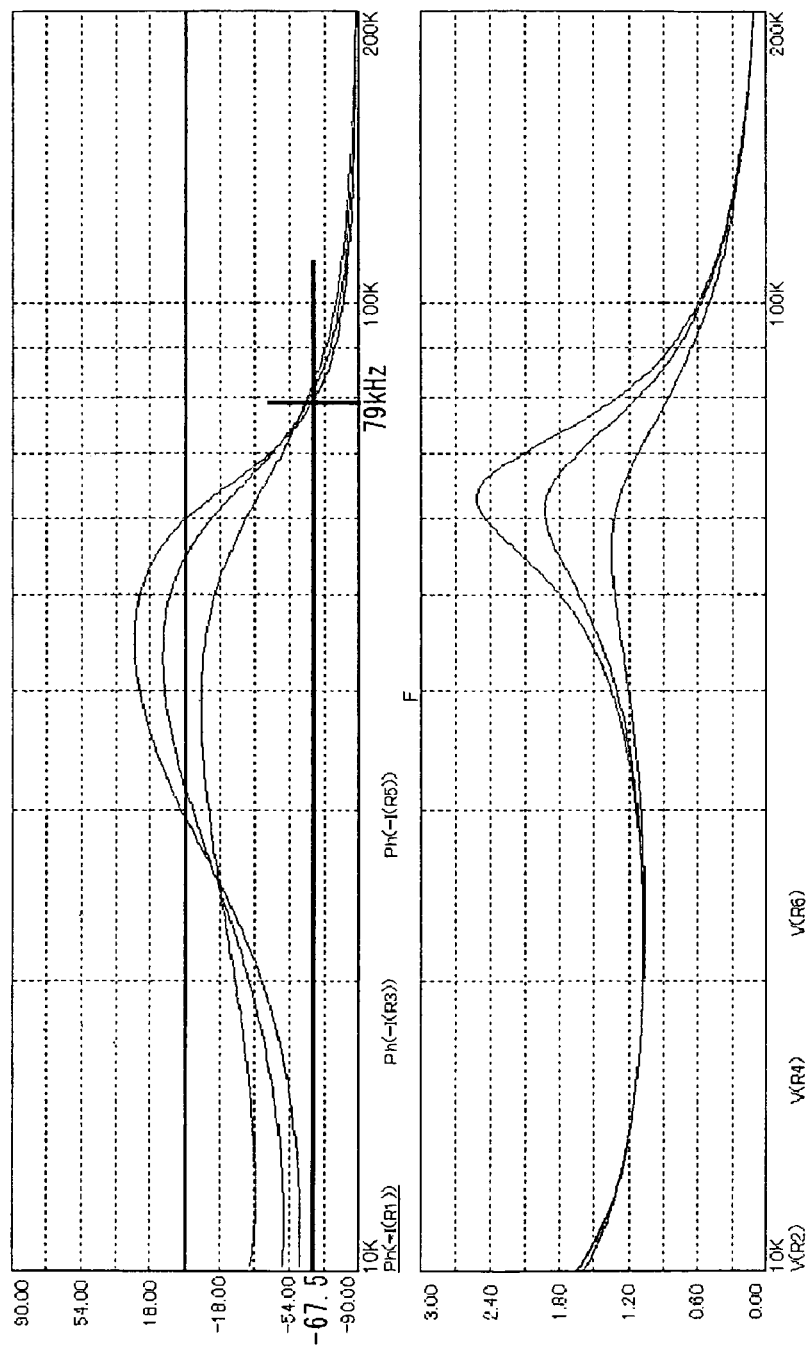
FIG. 40 is an explanatory diagram illustrating that an operational frequency of the inverter circuit is determined by the delay angle in the conventional zero current switching circuit.
Figure 41:
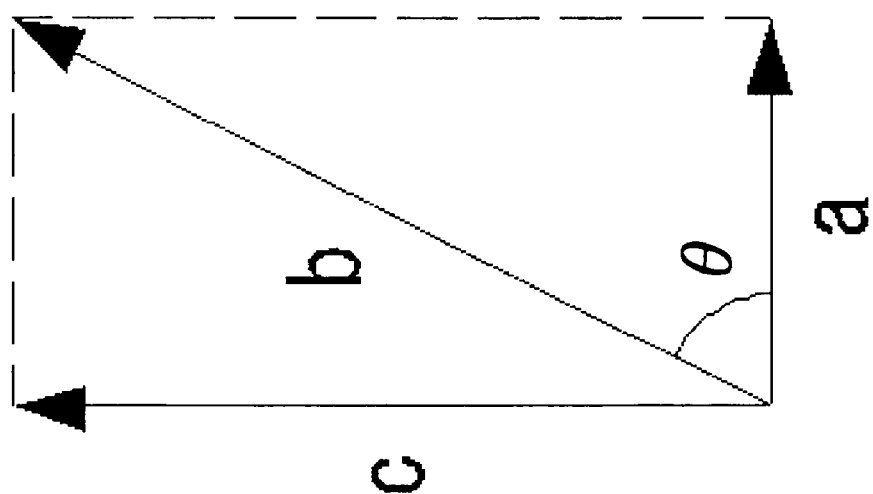
FIG. 41 is a figure in which consideration is given for power factor in which a load current converted on the primary side is set to a in the conventional zero current switching circuit.
Figure 42:
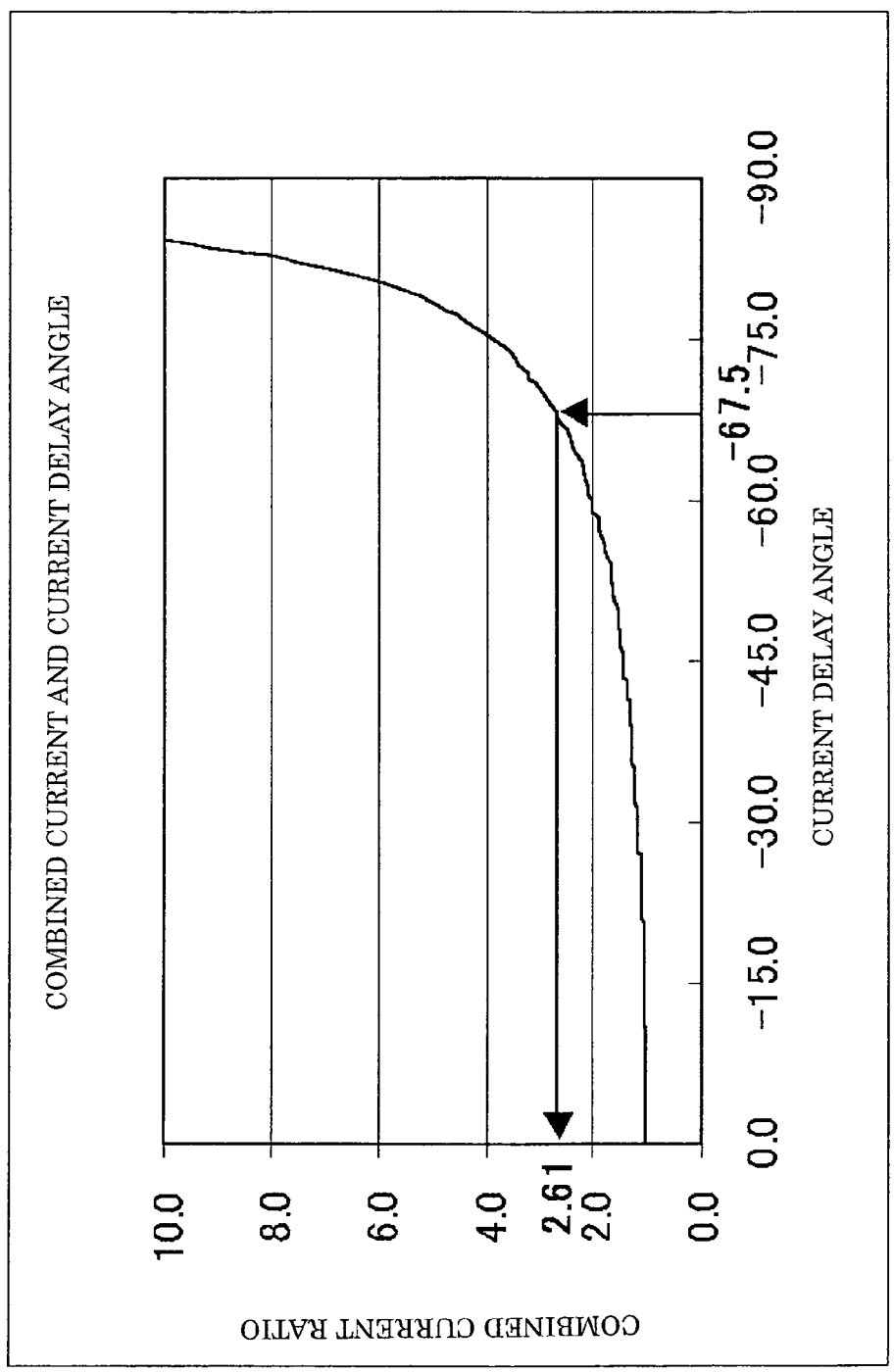
FIG. 42 is an explanatory diagram showing the relation among the load current converted on the transformer primary side, an exciting current, and a current through the primary winding when considering the power factor shown in FIG. 41.

However, as disclosed in the specification of Japanese Patent Application No. 2004-318059 and Japanese Examined Patent Publication Sho 63-005996, "undesired resonance" sometimes occurs in the primary winding of the step-up transformer for a cold cathode fluorescent lamp as shown in FIG. 6, and it is often the case that an ideal sine wave is not necessarily created as shown in FIG. 36. Since the "undesired resonance" leads to unstable operation of the inverter circuit of conventional current-mode resonant current detecting means, caution have to be taken.

On the contrary, the current detecting means shown in FIG. 3, which detects the resonance current flowing through the resonance capacitor, can obtain a waveform closest to a sine wave. In the current detecting means shown in FIG. 4, a sine wave including some distortion is created.

Furthermore, because the voltage detected in FIG. 3 has the property of maintaining a roughly constant value due to the constant voltage characteristic of a discharge lamp irrespective of lamp current scale, a control circuit is easily assembled with such a comparator even when a particular waveform shaping is not performed.

Figure 8:
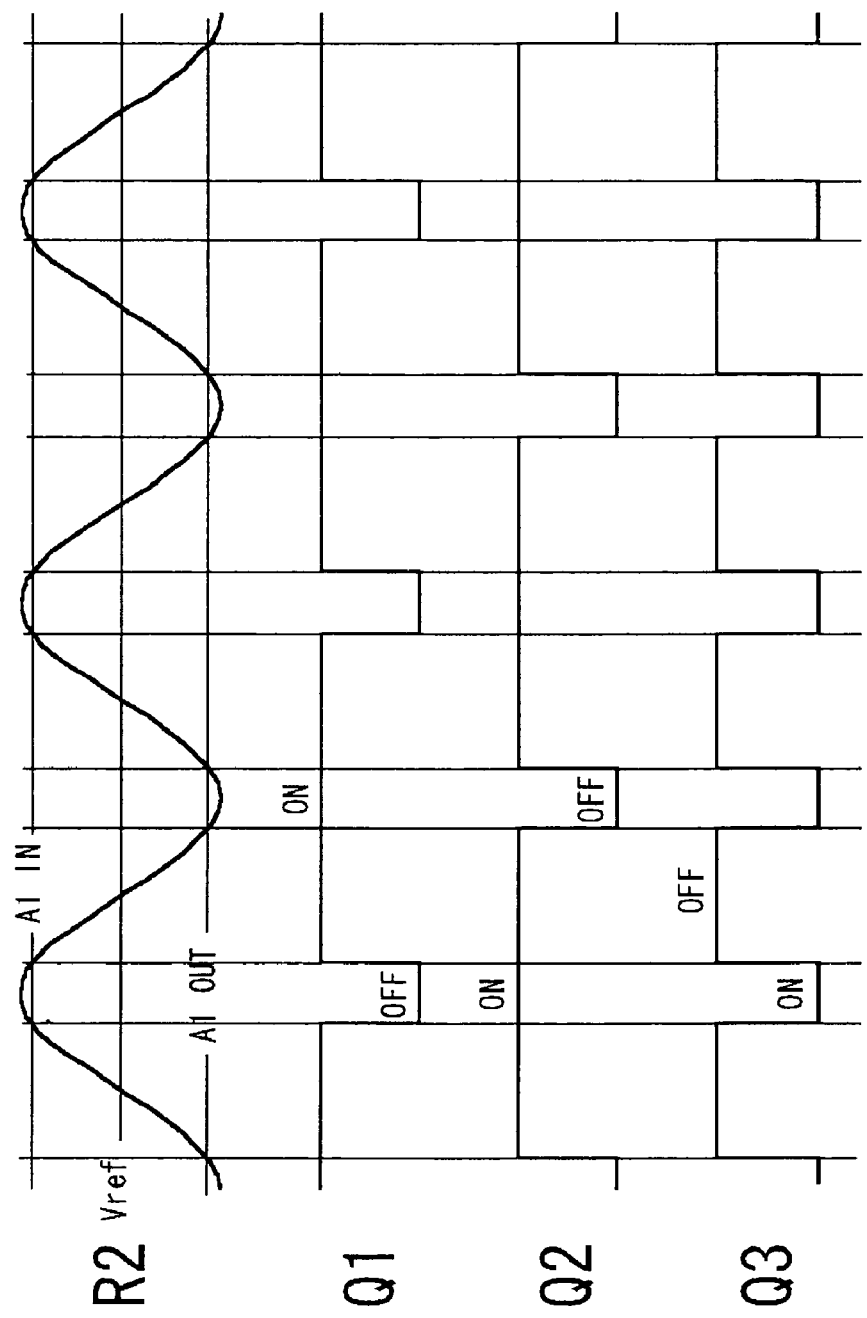
FIG. 8 is a timing diagram showing an output waveform which illustrates a state in which power is controlled in the circuit shown in FIG. 7.

The state in which power is controlled in the circuit shown in FIG. 7 is shown based on FIG. 8. The voltage generated in the resistor R2 of the current detecting means is applied to comparators A2, A3. The comparators A2, A3 are connected so as to make a comparison in the opposite phase with respect to the resistor R2 voltage.

The other end of the resistor R2 is connected to the reference voltage Vref so as to apply the reference voltage to the comparator. The reference character Bc denotes a comparison voltage for light control. The comparison voltage is applied to one input terminal of the comparator A3 through a resistor R6, reversed in phase by an operational amplifier A1 and also applied to the comparator A2. In the circuit shown in FIG. 7, diodes D2, D3, a resistor R4 and a capacitance C1 detects a lamp current so as to compose a lamp current negative feedback circuit.

As a result, these voltages, by being compared with the voltage generated in the resistor R2 of the current detecting means by the comparators A2 and A3, produce switching signals of the transistors Q1, Q2. These switching signals, which are complementary as shown in FIG. 8, are alternately given to the gate of the transistors Q1 and Q2 so as to switch the transistors Q1 and Q2. The switching timing is determined so that OFF time increases/decreases with the peak or valley of the sine wave created in the resistor R2 as a center. An AND circuit G1 sets a switching timing of a transistor Q3 based on the signals. What is important here is that due to the voltage applied to the step-up transformer T1 primary winding by the timing when the transistor Q3 is turned on, the effective value of the voltage applied to the step-up transformer primary winding and the voltage generated in the resistor R2 (the current detecting means), almost coincide in phase. As such, the effective value of the voltage applied to the step-up voltage almost coincides in phase with the resonance current.

Next, a description is given as to how the operational frequency of the inverter circuit is determined.

If the resonance frequency of the secondary side circuit should become higher than the operational frequency of the inverter circuit, the voltage generated in the current detecting means R2 slightly delays in phase with respect to the effective value of the voltage applied to the step-up transformer primary winding. As a result, the switching signal produced through the comparators A2 and A3 delays in phase, thereby lowering the frequency of the inverter circuit. On the contrary, when the operational frequency of the inverter circuit becomes lower, the switching signal produced through the comparators A2 and A3 advances in phase, thereby raising the operational frequency of the inverter circuit.

The operational frequency of the inverter circuit is automatically fixed with the resonance frequency in the secondary side circuit.

Specifically, this circuit automatically searches for the resonance frequency in the secondary side resonance circuit. If capacitive components Cw, Ca and Cs of the secondary side circuit are set to be small, the oscillation frequency becomes higher accompanied by the resonance frequency of the inverter circuit also becoming higher. On the contrary, if the capacitive components Cw, Ca and Cs of the secondary side circuit are set to be large, the oscillation frequency becomes lower accompanied by the resonance frequency of the inverter circuit becoming lower. Even when power is controlled for light control, the operational frequency of the inverter circuit is constantly adjusted with the resonance frequency of the secondary side circuit.

The technical idea of the present invention differs greatly from that of the zero current switching method in that the current flowing through the switching means is not detected in either controlled state, and no information of being at zero current is required.

Next, the circuit shown in FIG. 7 is configured so that the ON times of the transistor Q1 and transistor Q2 overlap each other. This configuration short-circuits the current flowing through the step-up transformer primary winding at zero potential during the overlap period.

However, the overlap is not necessary in order to improve the efficiency of the inverter circuit. For low power use, a diode generally built into a MOS field-effect transistor FET may be an alternative. For high power use, a schottky diode with a small drop in forward voltage Vrf may be connected in parallel as an alternative.

Rather, if an appropriate regeneration period is set by using a schottky diode, the current flowing through the step-up transformer primary winding becomes closer to a sine wave.

Therefore, this embodiment is only one example in which the present invention has a simple configuration. The regeneration period shown in the invention of Japanese Patent Application No. 2004-318059 (corresponding to U.S. patent application Ser. No. 11/261,492) according to the application by the present inventors may be set as appropriate so as to dump undesired resonance. Also, by omitting the transistor Q3 and reversing the switching phases of the transistors Q1 and Q2, any time except during ON time is devoted to the regeneration period for power control.

Next, FIG. 9 shows an embodiment composed of a full-bridge type circuit, in which the basic structure up to the output of the comparators A2 and A3 is the same. Because of a full-bridge type circuit, a dead time for preventing ON time of above and below transistors from overlapping each other is necessary to prevent through current from occurring between the transistors Q3 and Q1 or transistors Q4 and Q2 composing a push-pull circuit on one side. It should be noted that the necessity of dead time is known. The timing is generated by the delay and the gates G1 to G4.

The coupling capacitor Cc is to cut the direct current flowing through the step-up transformer primary winding when the switching timing of the full-bridge type circuit is off thereby losing the balance. It should be noted that, in the present invention, the coupling capacitor Cc preferably has a large enough capacity and a method which does not interfere with resonance is recommended.

Many of the conventional fixed frequency type driving means and zero-current type driving means operate the coupling capacitor Cc as a part of the resonance circuit by setting its capacitance value to be small. As a result, however, heat is generated in the transformer primary winding, thereby worsening the conversion efficiency of the inverter circuit.

Figure 10:
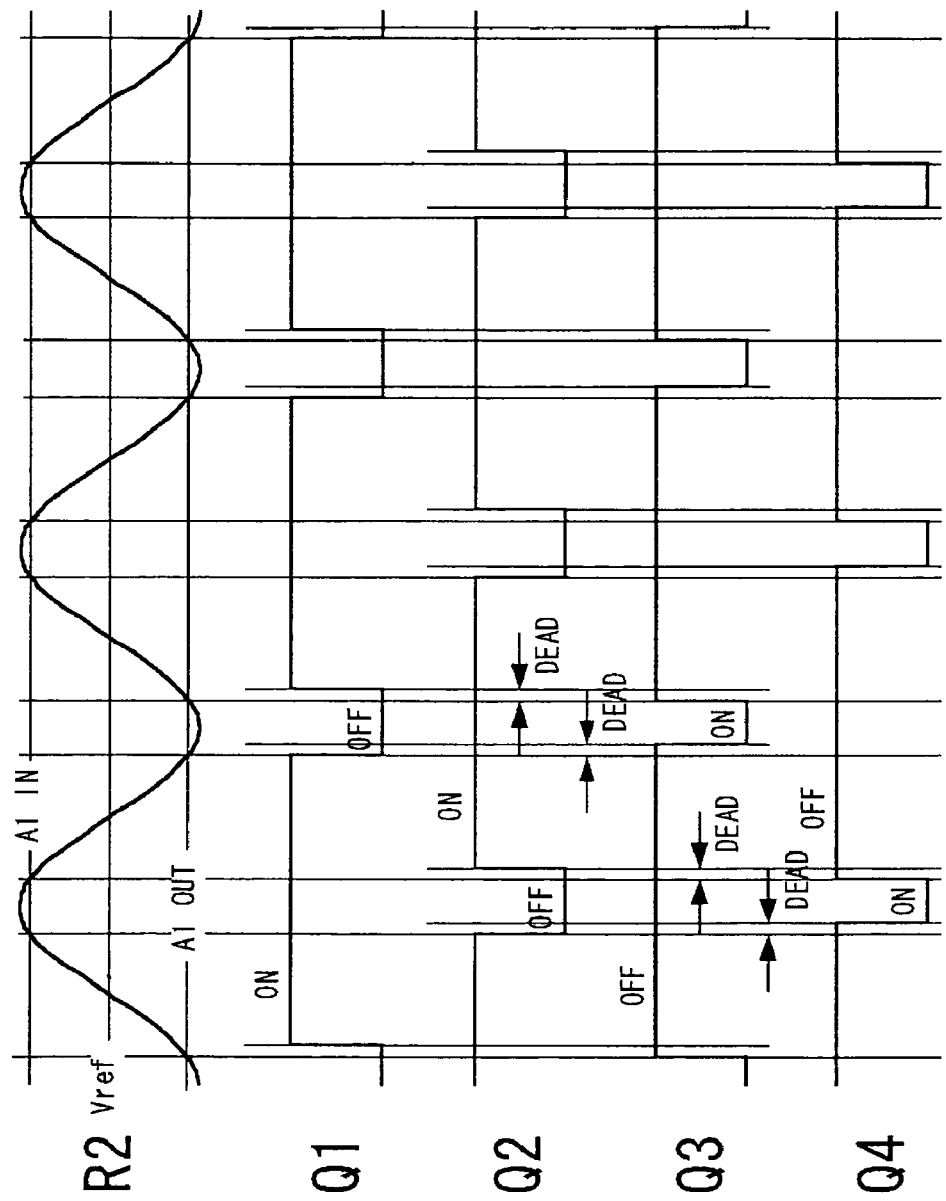
FIG. 10 is a timing diagram showing an output waveform which illustrates a state in which power is controlled in the circuit shown in FIG. 9.

It should be noted that, for reference, the power control state of the circuit shown in FIG. 9 is shown in FIG. 10. Except that dead timing is provided, its basic waveform is the same as that in FIG. 8.

The above embodiment relates to the case in which a circuit is composed of an operational amplifier and a gate circuit. However, the circuits can be composed of an AD converter, a digital counter, an adder and a magnitude comparator. Also, a control signal of each switching means is produced by calculation using a central processing unit CPU or the like.

There are other circuit types to achieve the present invention, which are equivalent to those used in the present invention.

(Operation)

First, a description is hereinafter given in generalities as to why the current-mode resonant driving means allow the inverter circuit to achieve high conversion efficiency.

Figure 11:
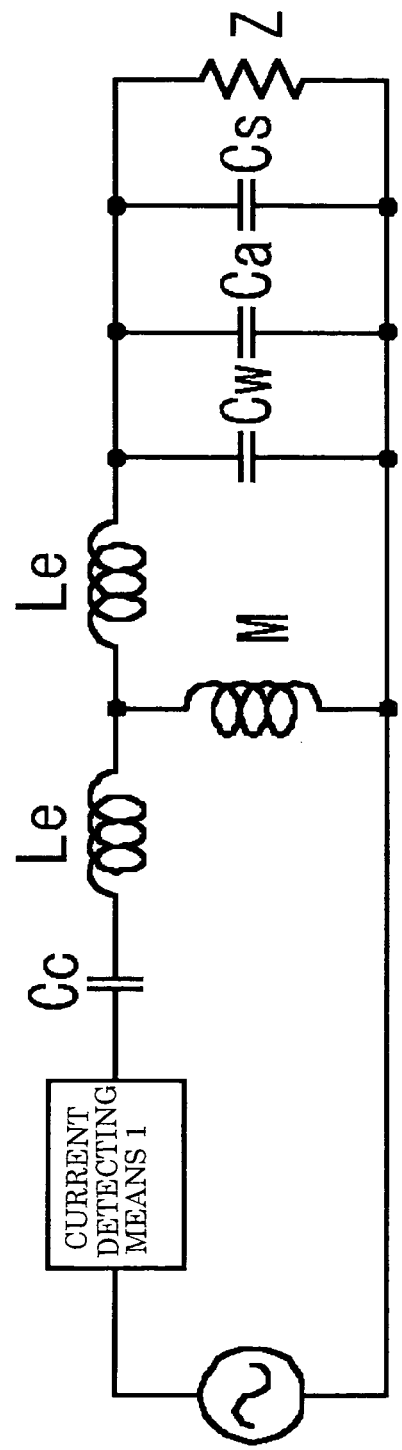
FIG. 11 is an explanatory diagram illustrating an equivalent circuit to the secondary side resonant circuit including up to the primary drive circuit of a step-up transformer in a conventional art.

FIG. 11 is an explanatory diagram illustrating the equivalent circuit to the secondary side resonant circuit including up to the primary drive circuit of the step-up transformer, showing the relation between the step-up transformer and the cold cathode fluorescent lamp as a load in the inverter circuit for a cold cathode fluorescent lamp in a conventional current-mode resonant circuit. In this equivalent circuit, the step-up transformer is shown as a three-terminal equivalent circuit.

U.S. Pat. No. 6,114,814-B1, No. 6,633,138, No. 6,259,615 and No. 6,259,615, and Japanese Laid-Open Patent Publication No. 2002-233158 refer to the circuit as a "tank circuit", while Japanese Laid-Open Patent Publication No. Sho 59-032370, Japanese Patent No. 2733817 (U.S. Pat. No. 5,495,405) by the present inventor and Japanese Laid-Open Patent Publication No. 2003-168585 refer to it as "resonant circuit". However, in these documents, both "tank circuit" and "resonant circuit" refer to the same type of circuit. In this case, the current detecting means is provided on the primary side of the step-up transformer.

In FIG. 11, the reference character Cc denotes a coupling capacitor on the primary side, which is inserted as required in order to cut off direct current in the conventional current-mode resonant circuit, and alternatively, in order to cut off the direct current component caused by unbalanced switching when the driving means is an H-Bridge circuit. In general, it is better for the inverter circuit for a cold cathode fluorescent lamp not to be involved in resonance by giving Cc a large enough value. It should be noted that, if the coupling capacitor Cc is involved in resonance, more heat is generated in the inverter circuit thereby decreasing the conversion efficiency.

The reference character Le denotes the leakage inductance (called by concerned academic societies) of the transformer, which is distinguished from the leakage inductance (JIS) Ls based on the JIS measurement method. The reference character M denotes the mutual inductance of the transformer. The reference character Cw denotes the distributed capacitance of the transformer secondary windings, Ca the resonance capacitance added as required for adjusting resonance frequency, Cs the parasitic capacitance generated around the discharge lamp, which are combined so as to compose the resonance capacitance on the secondary side. The reference character Z denotes the impedance of the discharge lamp.

For reference, if the self-inductance of the transformer winding is set to $L_0$, and coupling coefficient to k, there is the following relation between the values:

$$Le = k \cdot Lo$$

$$M = (1-k) \cdot Lo$$

$$L_s = L_e + \frac{1}{\frac{1}{L_e} + \frac{1}{M}}$$

It should be noted that, in a common current-mode resonant circuit, the resonance current detecting means, which is provided on the transformer primary side, detect the current input on the transformer primary side.

The circuit simulation using the equivalent circuit has obtained the following result.

Figure 12:
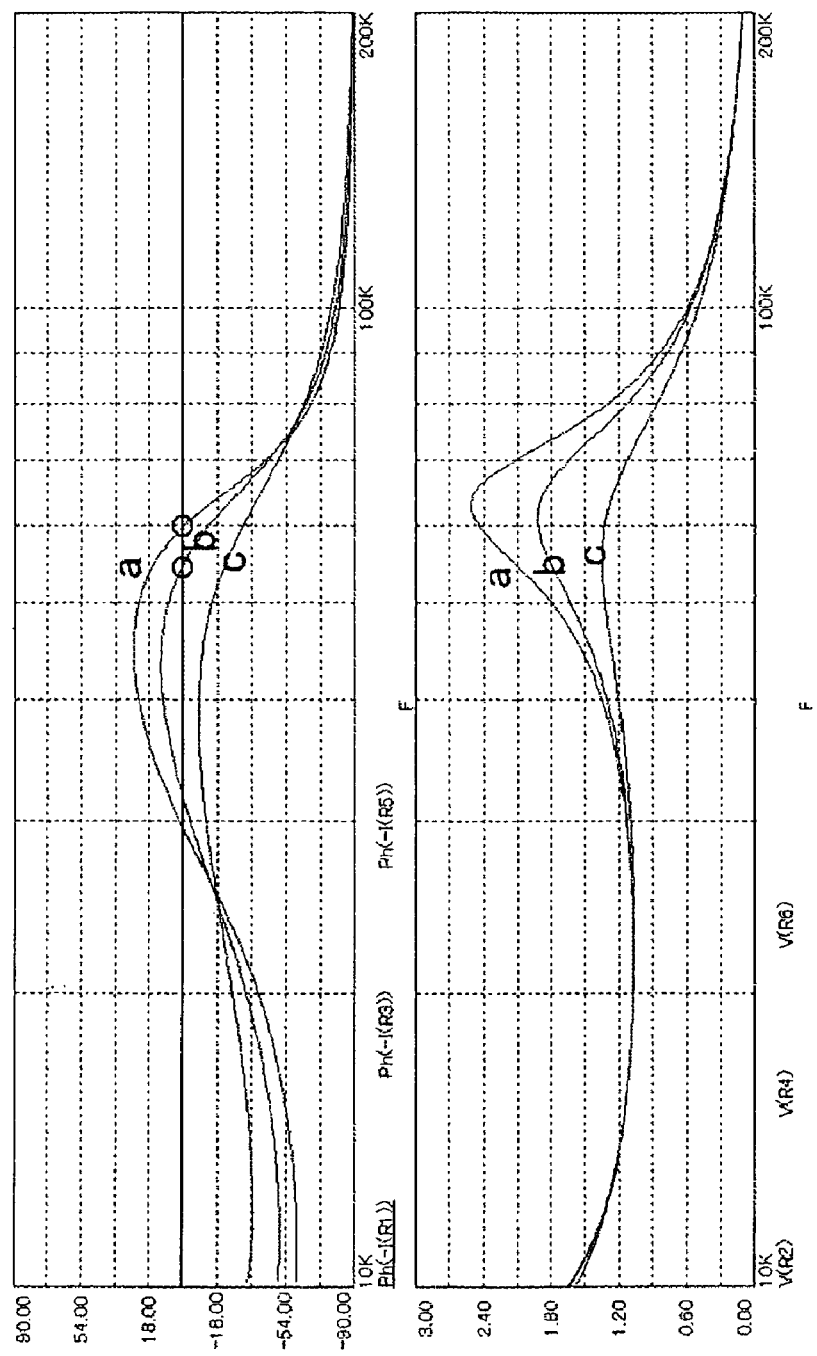
FIG. 12 shows explanatory diagrams illustrating phase characteristic (upper portion) and transfer characteristic (lower portion) when a simulation is performed by the equivalent circuit shown in FIG. 11, wherein the horizontal axis represents frequency.

FIG. 12 shows explanatory diagrams illustrating phase characteristic (upper portion) and transfer characteristic (lower portion), and each horizontal axis represents the drive frequency of the inverter circuit. FIG. 12 (upper portion) shows the phase relation between the voltage and current as seen from the transformer primary side. FIG. 12 (lower portion) shows the voltage applied to the impedance Z of the discharge lamp. In FIG. 12, the discharge lamp impedance Z changes in three levels: a method high impedance; b middle impedance; and c low impedance.

The resonant circuit on the secondary side for driving a cold cathode fluorescent lamp, which is referred to as "parallel loaded serial resonance circuit," performs a step-up operation depending on loads. In this case, in FIG. 12 (upper portion), at a frequency where the lines of phase characteristic and zero degrees cross each other, the drive frequency of the inverter circuit is determined. A detail description thereof is given below.

Considering the phase characteristic when the discharge lamp impedance Z changes from high, middle to low, as the discharge lamp impedance becomes lower compared with the impedance of the resonant circuit, as shown in FIG. 12 (upper portion), the current detected by the current detecting means 1 shown in FIG. 11 delays in phase with respect to the resonance current, and the oscillation frequency of the inverter circuit oscillates at a frequency lower than the resonance frequency of the resonant circuit.

When the impedance is low, there is no frequency which crosses the zero degree line. This means that, in a conventional current-mode resonant inverter circuit, if the discharge lamp impedance Z becomes lower to exceed a certain limit, continuous oscillation becomes impossible. This is known as the so-called "runaway effect" in the zero current switching-type drive circuit, which is regarded as a defect of the zero current switching type driving method. Here, the case in which the discharge lamp impedance is low specifically produces a result in that the Q value of the resonance circuit is low in the equivalent circuit shown in FIG. 11.

Specifically, the current-mode resonant circuit, as shown by the phase characteristic in FIG. 12 (upper portion), oscillates by automatically searching for the frequency at which there is no phase difference between the voltage phase on the step-up transformer primary side and the current phase in the oscillation frequency of the inverter circuit. Specifically, the current-mode resonant circuit operates by selecting the frequency at which power factor is good. As a result, since almost no exciting current flows on the step-up transformer primary winding side, copper loss in the step-up transformer primary winding, thereby improving the conversion efficiency of the inverter circuit.

Thus, the operation by driving the parallel loaded serial resonance circuit by the conventional current-mode resonant circuit has been described. Next, a description is given for the operation of the current-mode resonant circuit in the present invention.

Figure 13:
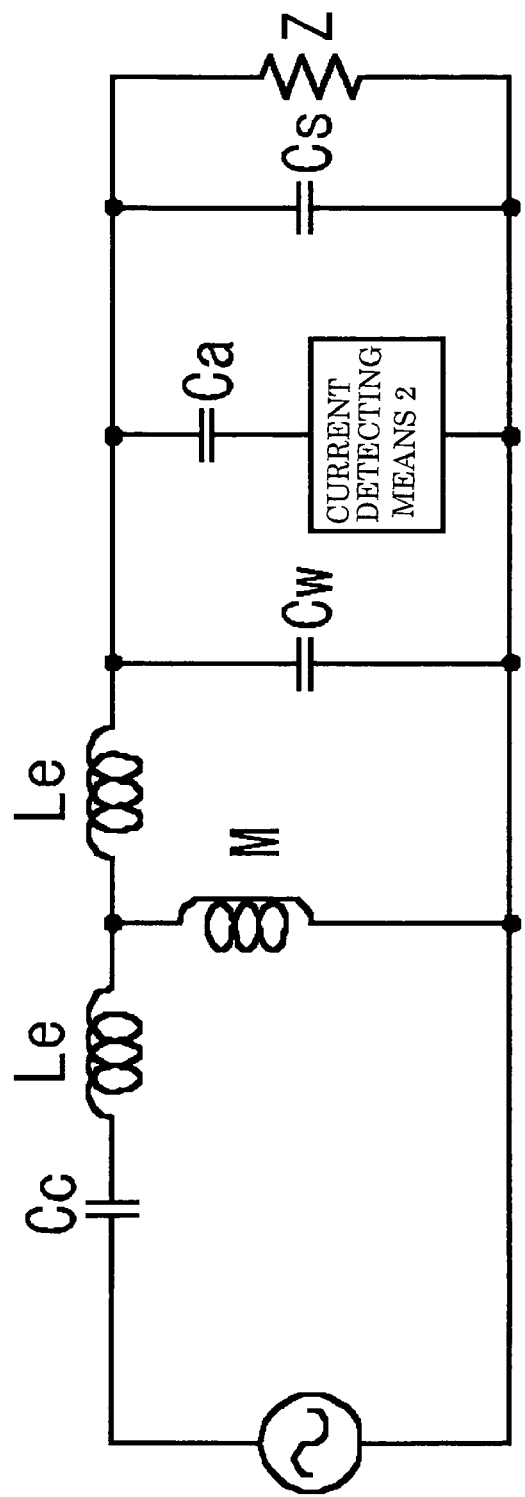
FIG. 13 is an explanatory diagram showing a circuit equivalent to the circuit shown in FIG. 2.

FIG. 13 shows a case in which the circuit shown in FIG. 1 is replaced with an equivalent circuit. A circuit simulation performed based on this circuit shows the following result.

Figure 14:
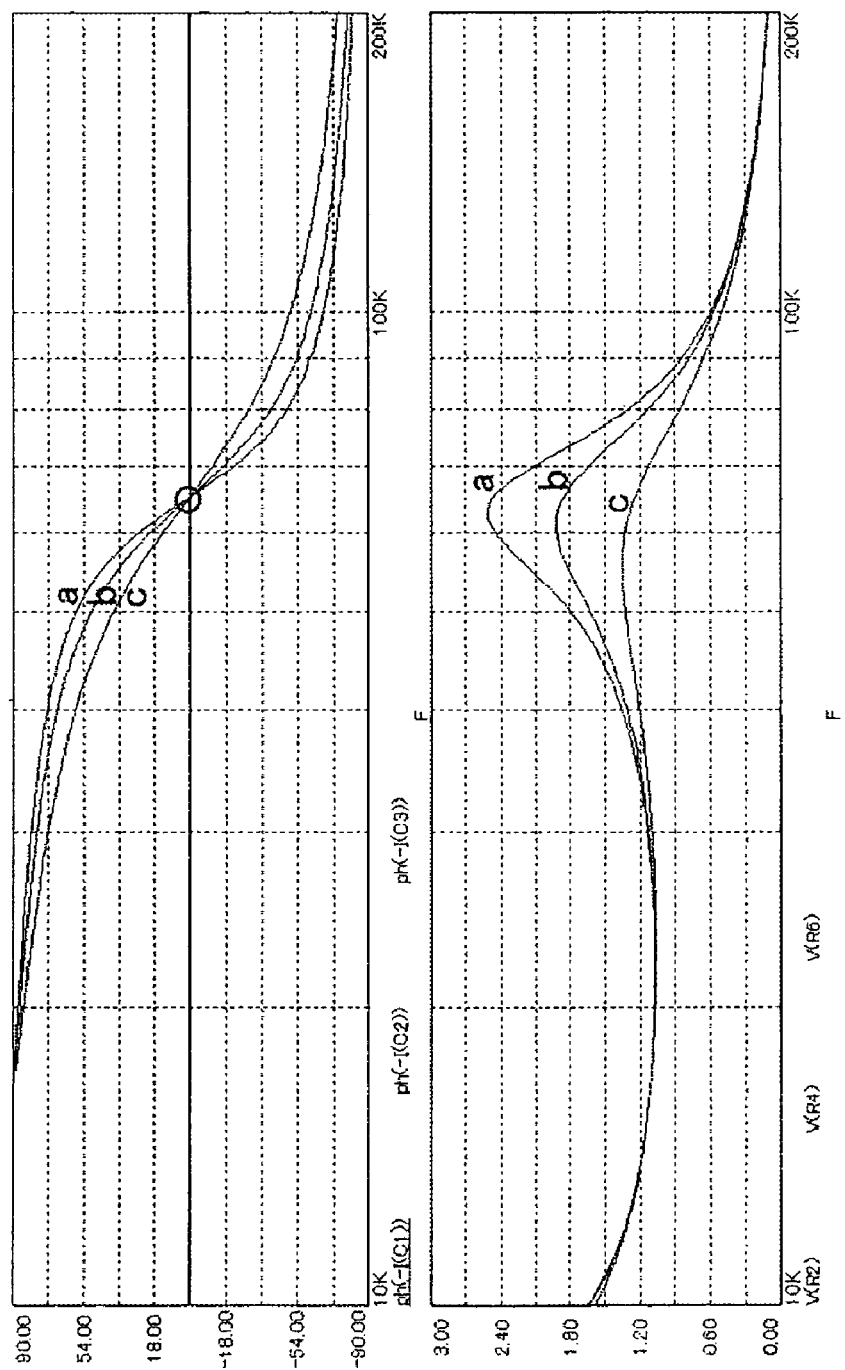
FIG. 14 shows explanatory diagrams illustrating phase characteristic (upper portion) and transfer characteristic (lower portion) when a simulation is performed by the equivalent circuit shown in FIG. 13, wherein the horizontal axis represents frequency.

In FIG. 14 (upper portion) and FIG. 14 (lower portion), the horizontal axis represents frequency. FIG. 14 (upper portion) shows phase characteristic, and FIG. 14 (lower portion) shows transfer characteristic. The reference character a refers to the cold cathode fluorescent lamp impedance being high; b middle impedance; and c low impedance.

The current-mode resonant circuit of the present invention determines the timing for switching the switching means by detecting the current flowing through the resonance capacitor Ca. Therefore, in FIG. 14 (upper portion), at a frequency at which phase characteristics a, b and c cross the zero degree line, the operational frequency of the inverter circuit is determined.

Also, in any of the cases in which the load impedance is high, middle and low, the operational frequency of the inverter circuit does not change characteristically.

Furthermore, different from the conventional current-mode resonant circuit, even when the load impedance is low and the value Q of the resonant circuit is low, continuous oscillation is possible in the inverter circuit without the runaway effect. This is because only a pure resonance current is detected, thus distinguishing over the current detecting means of the conventional current-mode resonant. Therefore, this detection means is not influenced by the amount of the current flowing through the load. Therefore, stable operation is possible in a wide load range from low load impedance up to high.

Figure 15:
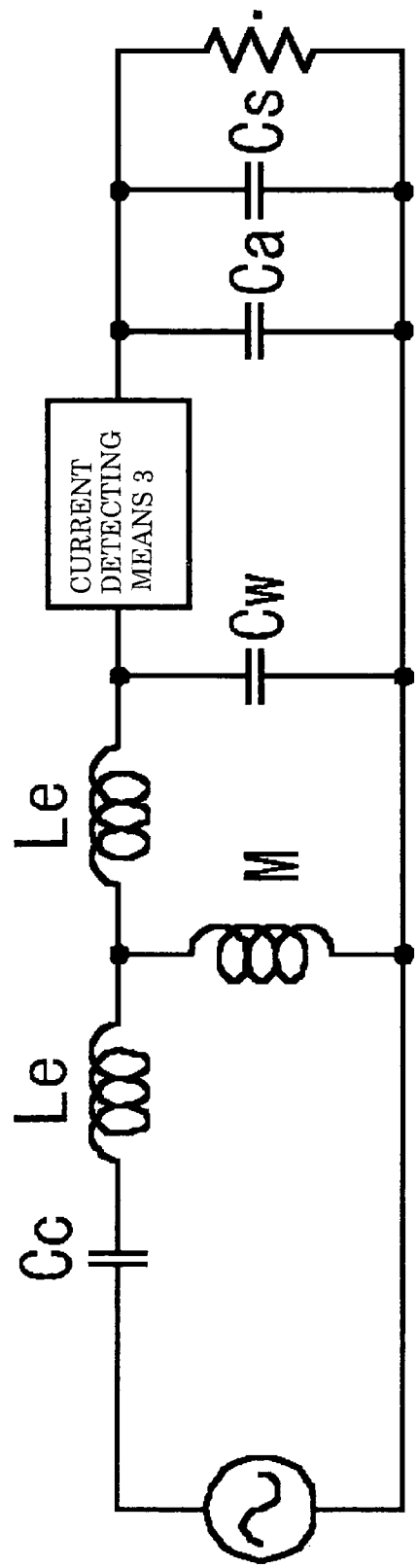
FIG. 15 is an explanatory diagram showing a circuit equivalent to the circuit shown in FIG. 4.

Next, a description is given for the operation of the current-mode resonant circuit based on the current detecting means shown in FIG. 15.

FIG. 15 shows a case in which the circuit shown in FIG. 4 is replaced with an equivalent circuit. The current detecting means is equivalent for a circuit simulation whether coupled to the GND side of the step-up transformer secondary winding or coupled to the high voltage side.

A circuit simulation performed based on this shows the following result.

Figure 16:
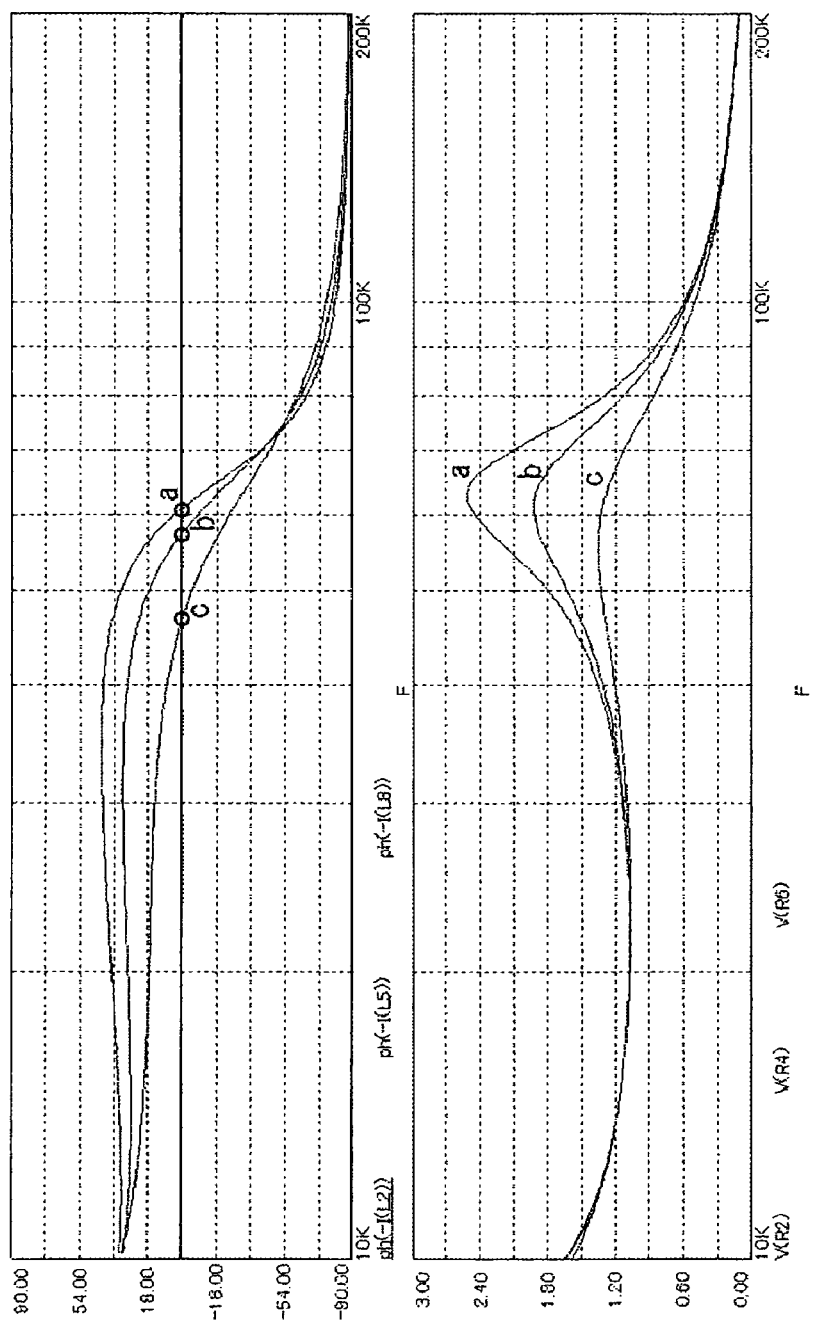
FIG. 16 shows explanatory diagrams illustrating phase characteristic (upper portion) and transfer characteristic (lower portion) when a simulation is performed by the equivalent circuit shown in FIG. 15, wherein the horizontal axis represents frequency.

In FIG. 16 (upper portion) and FIG. 16 (lower portion), the horizontal axis represents frequency. FIG. 16 (upper portion) shows phase characteristic similar to FIG. 12 and FIG. 16 (lower portion) shows transfer characteristic similar to FIG. 14 (lower portion). The references character a refers to the cold cathode fluorescent lamp being high; b middle impedance; and c low impedance.

The current-mode resonant circuit of the present invention determines the timing for switching the switching means by detecting the current flowing through the step-up transformer secondary windings. Therefore, in FIG. 16, at a frequency at which phase characteristics a, b and c cross the zero degree line, the operational frequency of the inverter circuit is determined.

Also, as the load impedance becomes lower from high, middle down to low, the drive frequency of the inverter circuit characteristically becomes lower. Here, what is different from the conventional current-mode resonant circuit is characteristically that the load impedance is small, and continuous oscillation is possible in the inverter circuit without the runaway effect even when the Q value of the resonant circuit is low. Therefore, stable operation is possible in a wide load range from low load impedance up to high.

Furthermore, the close relation in phase between the voltage effective value seen from the transformer primary winding side and the current means that the power factor is good.

Next, a description is given for the operation of power control method according to the present invention. In the present invention, power factor is not changed not only when no power control is performed, but also when using the power control method.

Figure 17:
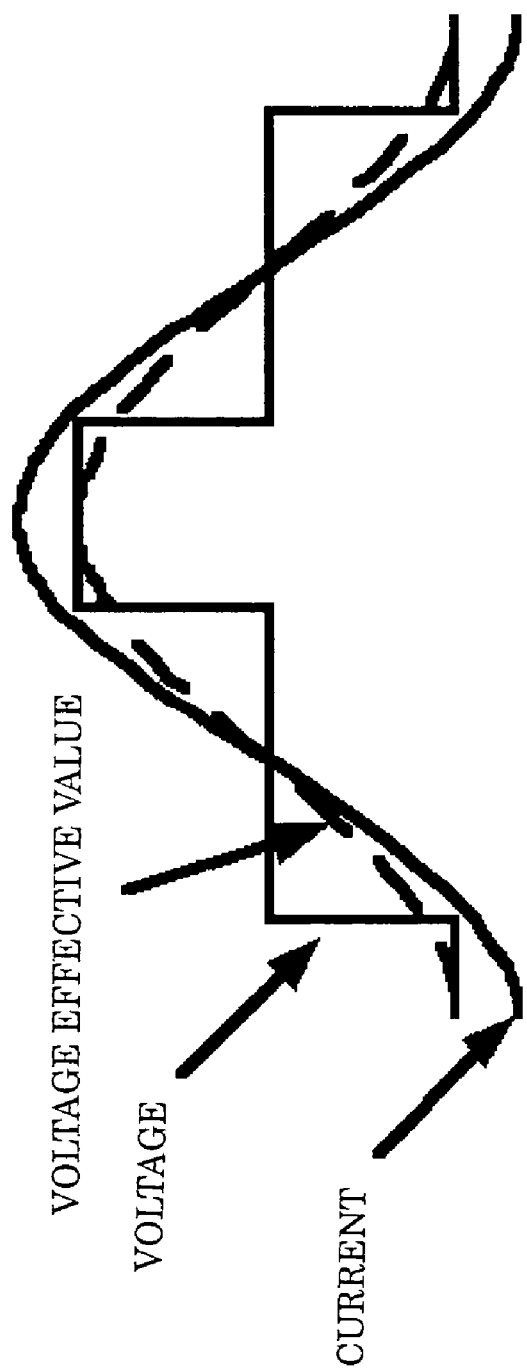
FIG. 17 shows the phase relation between the voltage effective value and current in the present invention, illustrating the power control method when the duty ratio becomes smaller so as to reduce the power of the inverter circuit.
Figure 18:
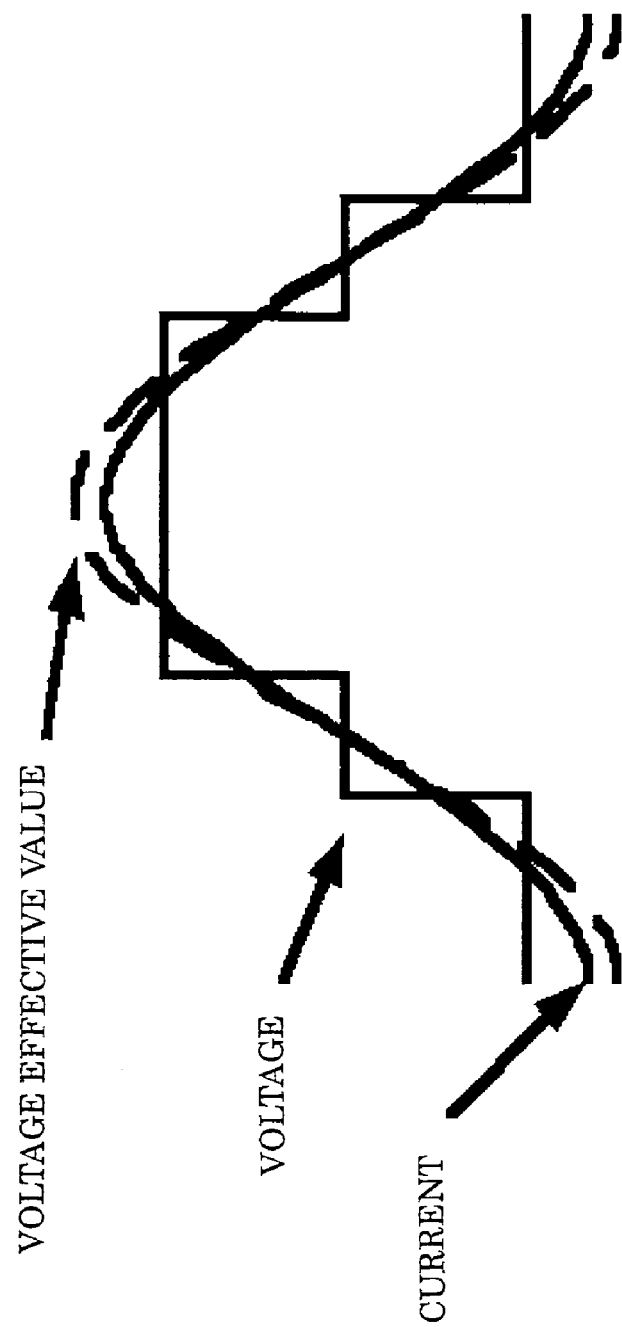
FIG. 18 shows the phase relation between the voltage effective value and current in the present invention, illustrating the power control method when the duty ratio becomes larger so as to increase the inverter circuit power.
Figure 19:
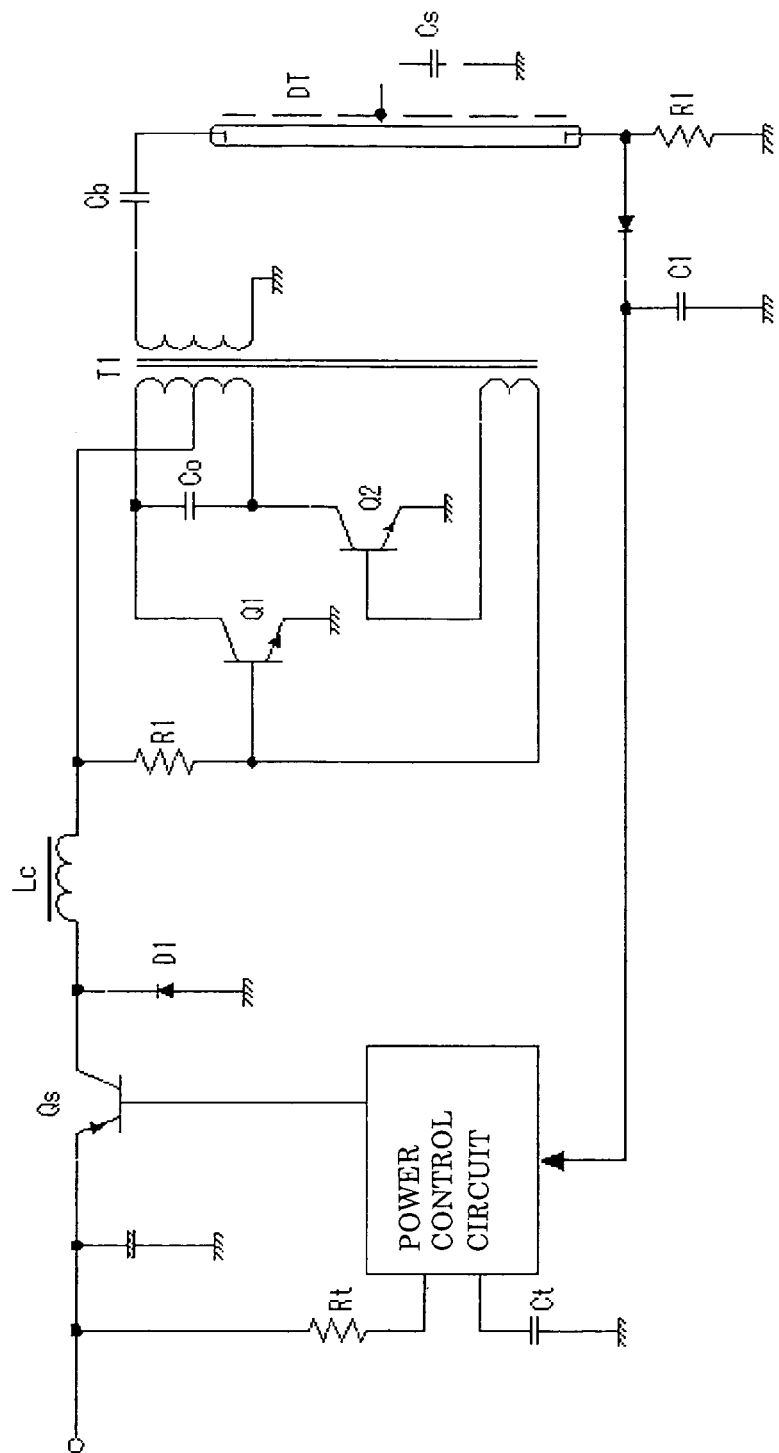
FIG. 19 is a circuit structural diagram showing a conventional collector resonant inverter circuit.
Figure 20:
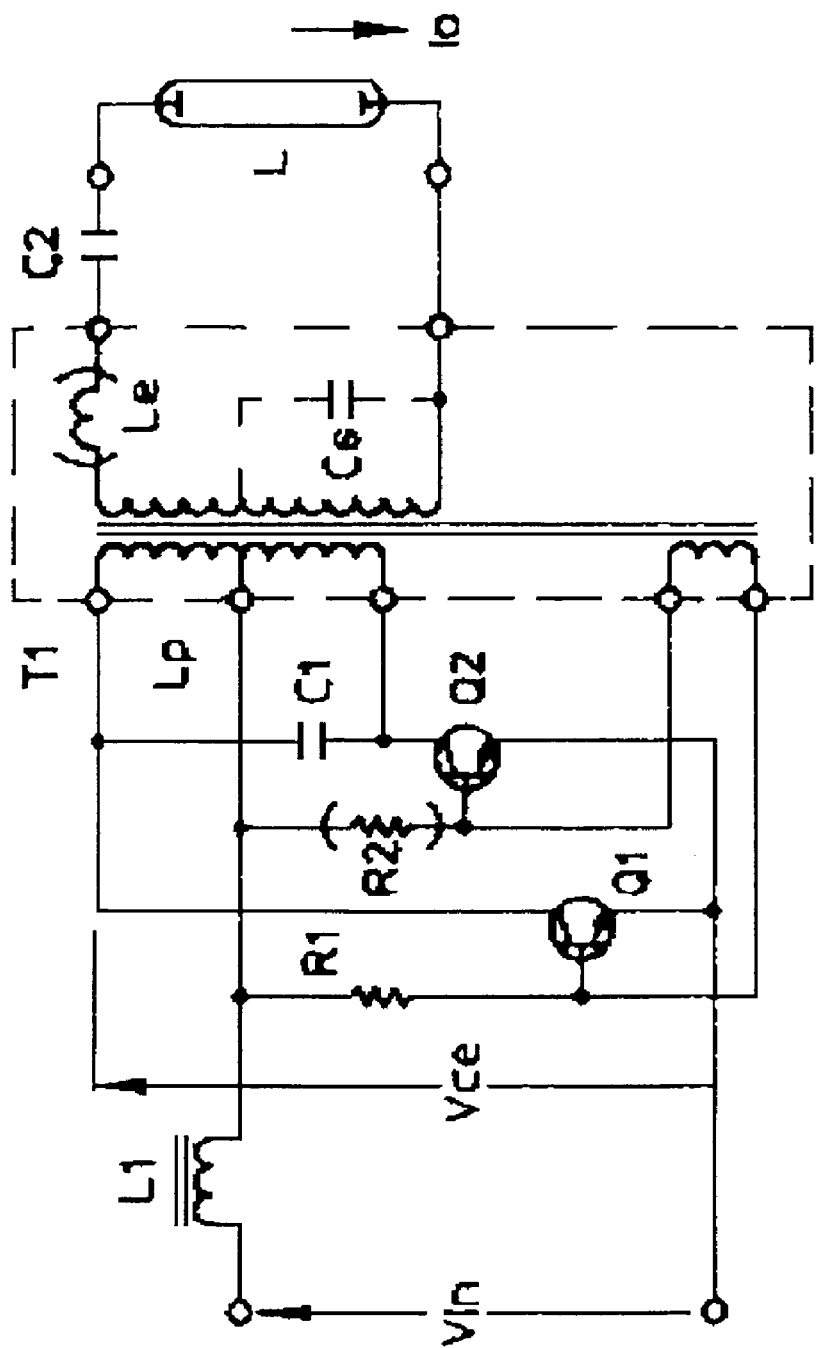
FIG. 20 is a circuit structural diagram showing one example of a conventional inverter circuit for a cold cathode fluorescent lamp.
Figure 21:
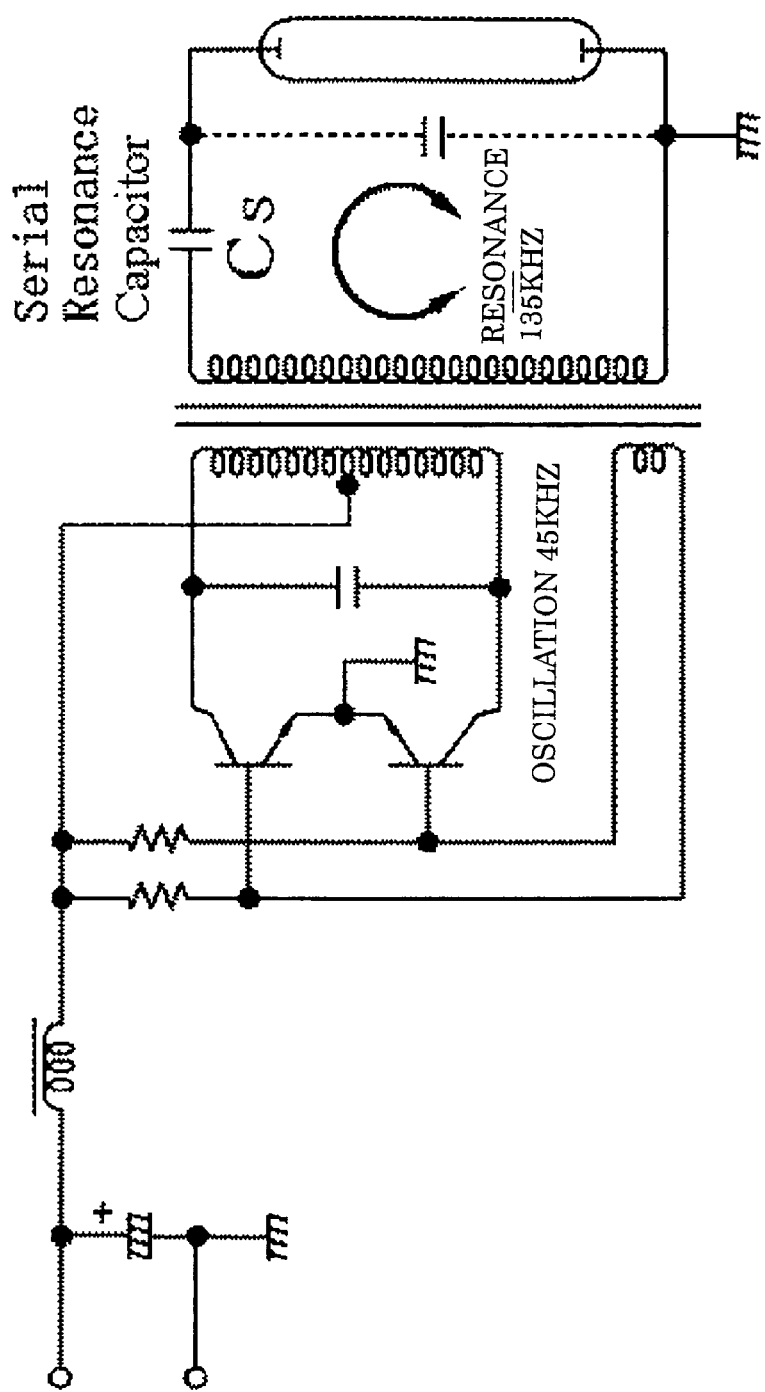
FIG. 21 is an explanatory diagram illustrating that the resonance frequency of the secondary side circuit of the inverter circuit shown in FIG. 20 is three times as high as the oscillation frequency of the primary circuit.
Figure 22:
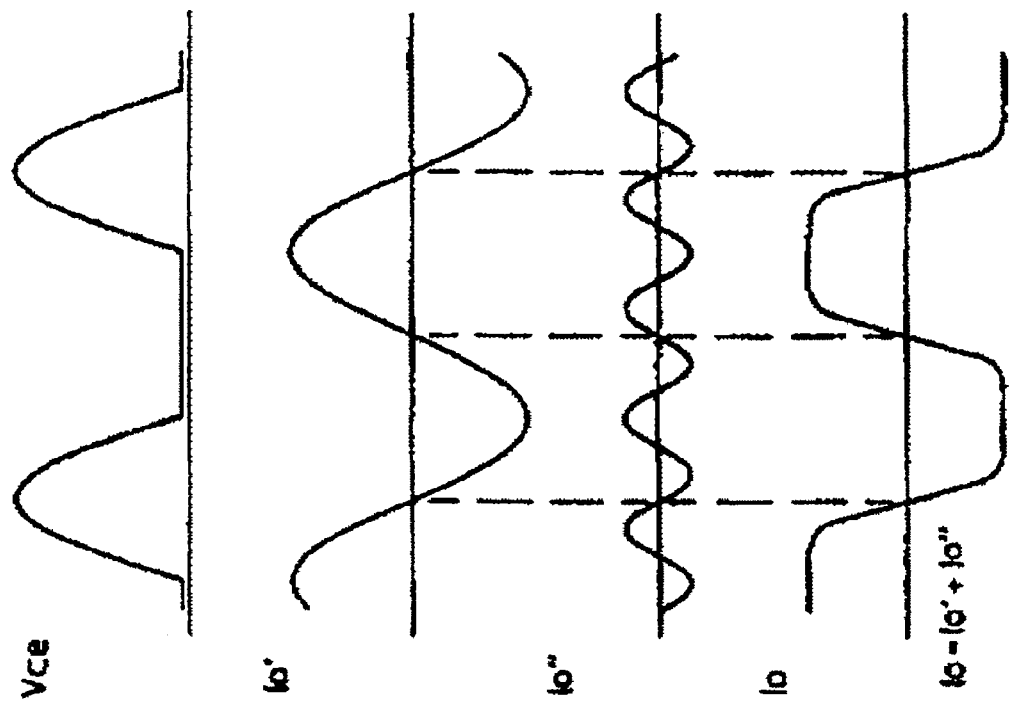
FIG. 22 is an explanatory diagram illustrating that the oscillation frequency and third-order harmonic in the inverter circuit shown in FIG. 20 are combined so as to create a trapezoidal waveform.
Figure 23:
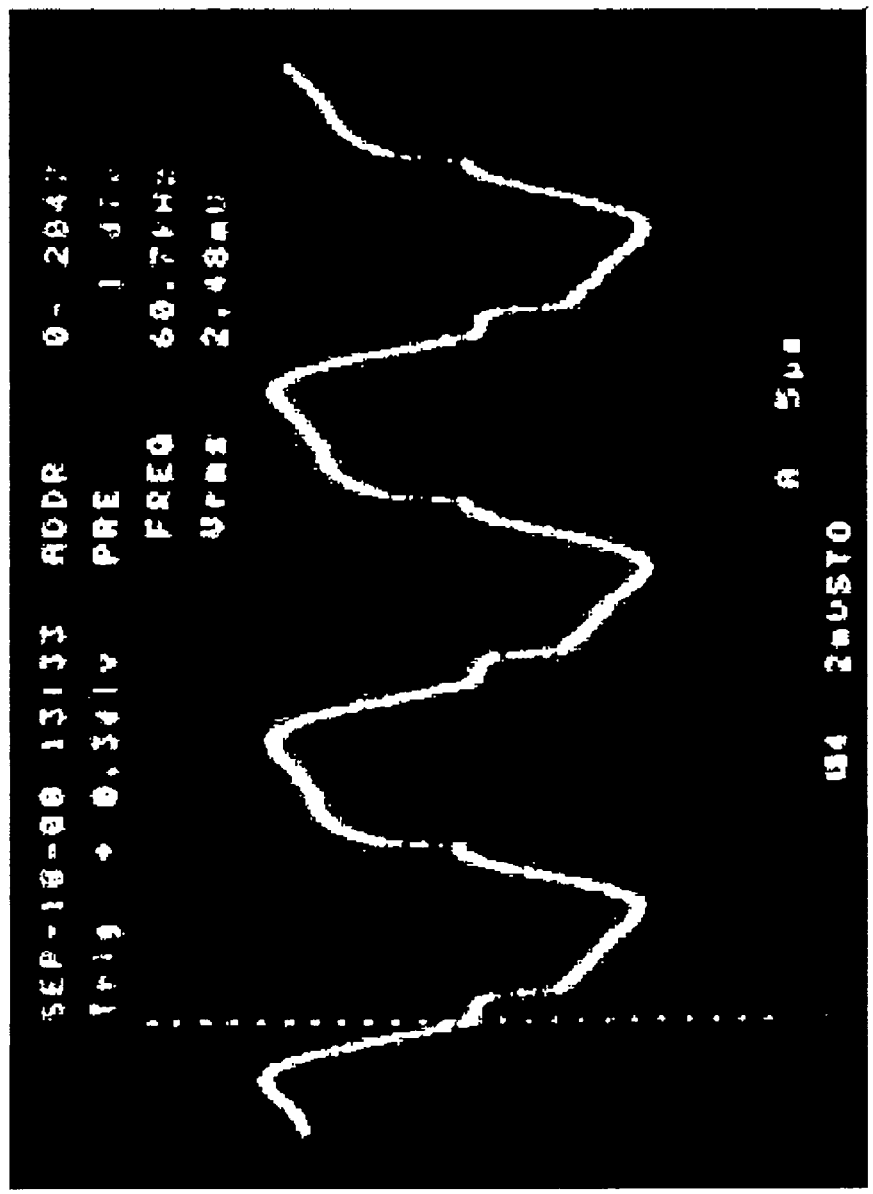
FIG. 23 is an explanatory diagram showing a waveform of the current flowing through a cold cathode fluorescent lamp of an actual triple resonant circuit of the inverter circuit shown in FIG. 20.
Figure 24:
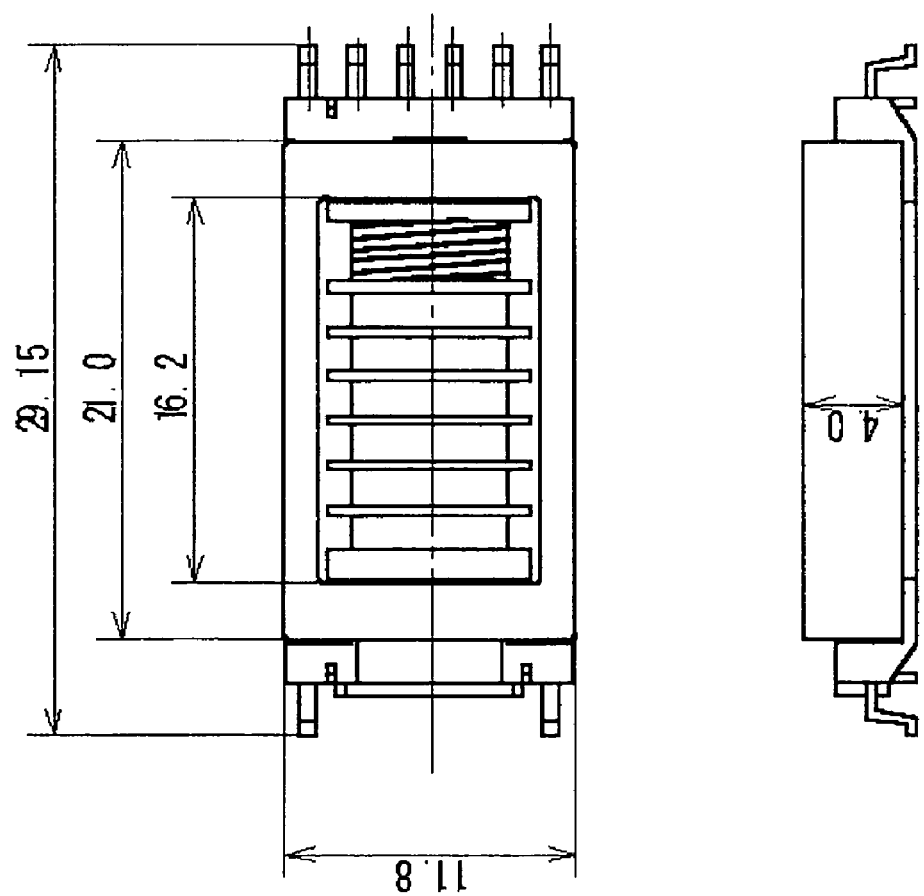
FIG. 24 is an explanatory diagram showing one example of a transformer, used in a conventional triple resonance, in which flux leakage is larger although a magnetic circuit structure is closed.
Figure 25:
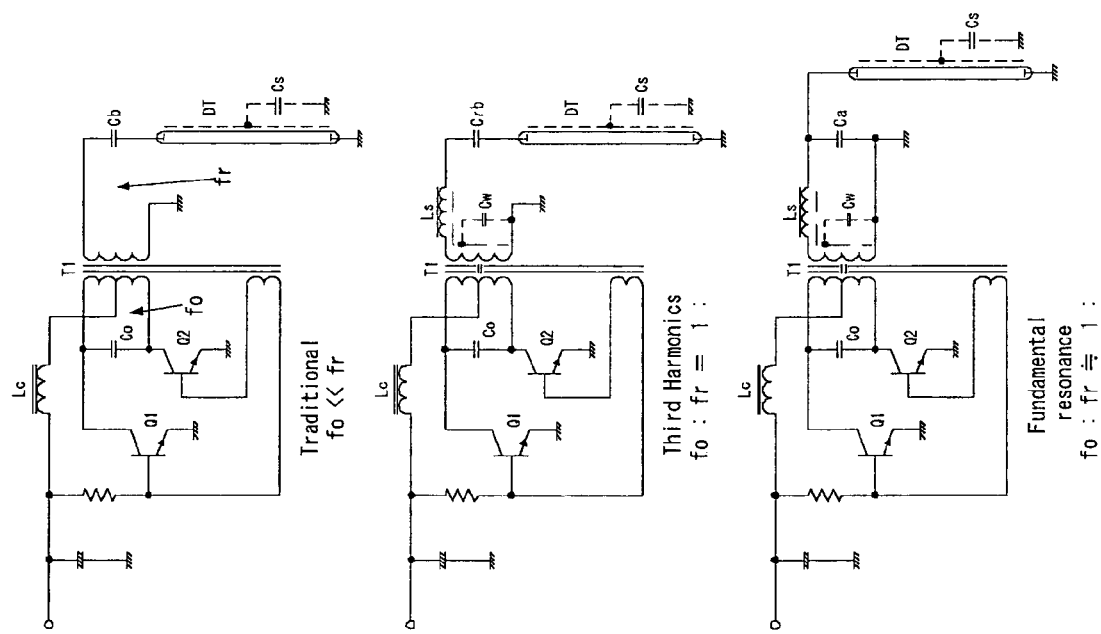
FIG. 25 is an explanatory diagram illustrating that the relation between $f_0$ and fr changes with the times, wherein $f_0$ represents drive frequency of the inverter circuit and fr resonance frequency of the secondary side circuit.
Figure 26:
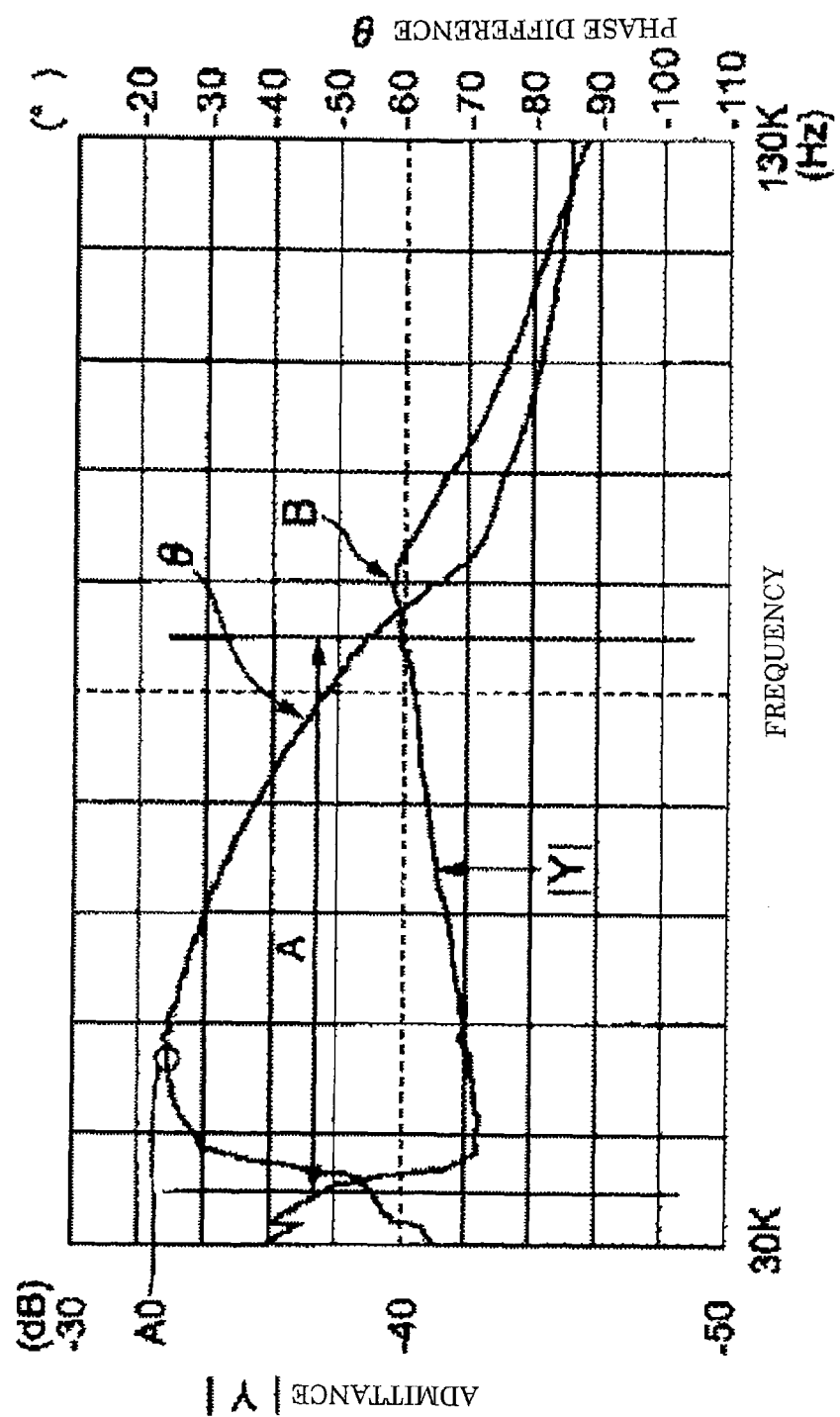
FIG. 26 is an explanatory diagram illustrating a scheme of improving power factor as seen from the driving means side in one exemplary conventional inverter circuit.
Figure 27:
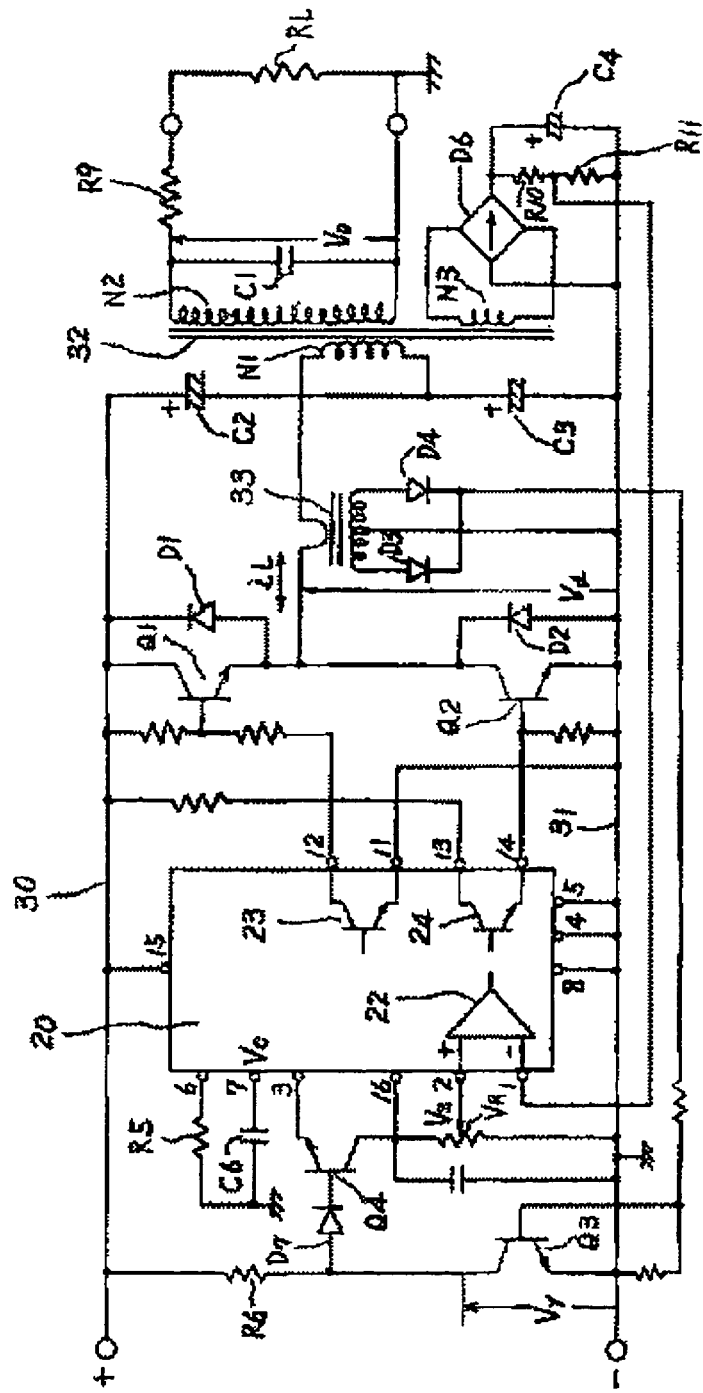
FIG. 27 shows a conventional, typical zero current switching type circuit.
Figure 28:
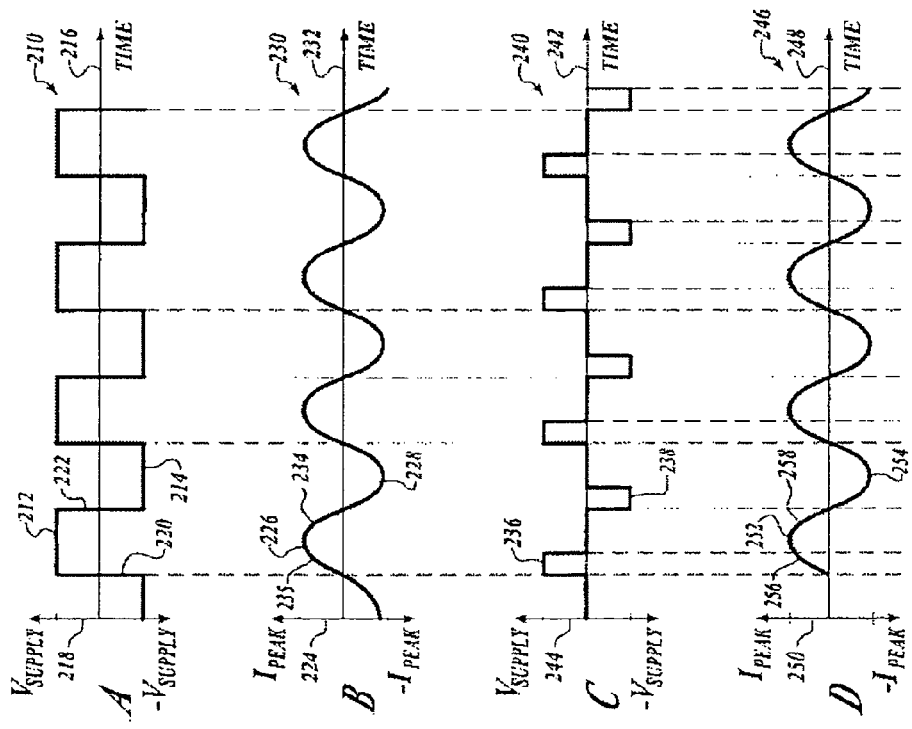
FIG. 28 shows explanatory diagrams illustrating control waveforms for explaining the operation of the conventional zero current switching type circuit and the phase relation therebetween, wherein A, B show a state in which no power control is performed and C, D a state in which power control has been performed.
Figure 29:
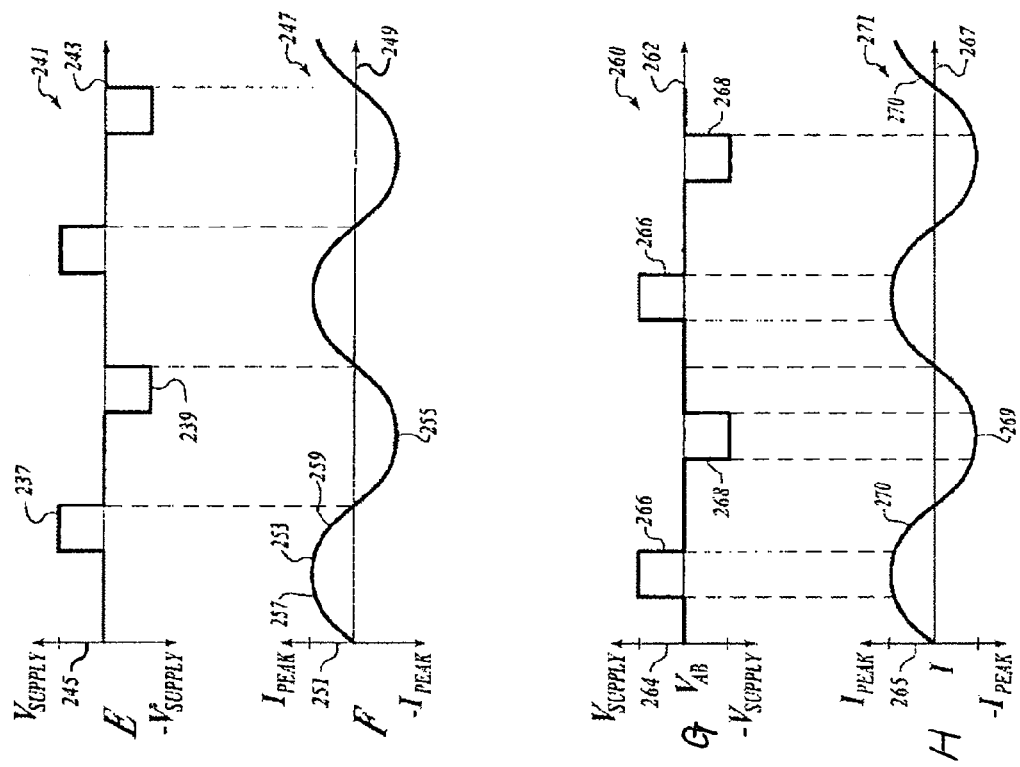
FIG. 29 shows explanatory diagrams illustrating control waveforms for explaining the operation of the conventional zero current switching type circuit and the phase relation therebetween, wherein E, F show a state in which zero current switching operation is attempted in a state that a voltage effective value advances in phase with respect to a current effective value, and G, H show one exemplary type of control which does not perform a zero current switching operation.
Figure 30:
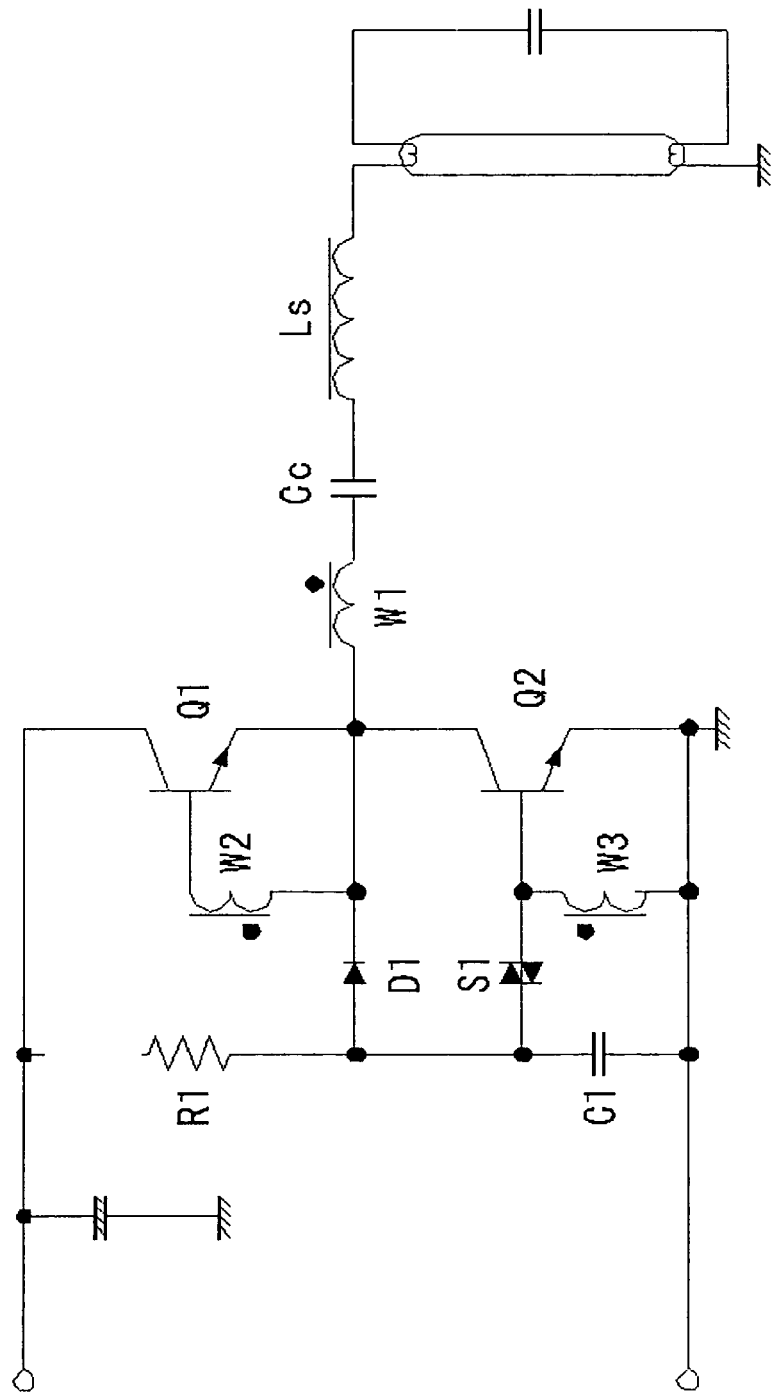
FIG. 30 is a circuit structural diagram showing one example of a current-mode resonant circuit which is known for a conventional hot cathode fluorescent lamp.
Figure 31:
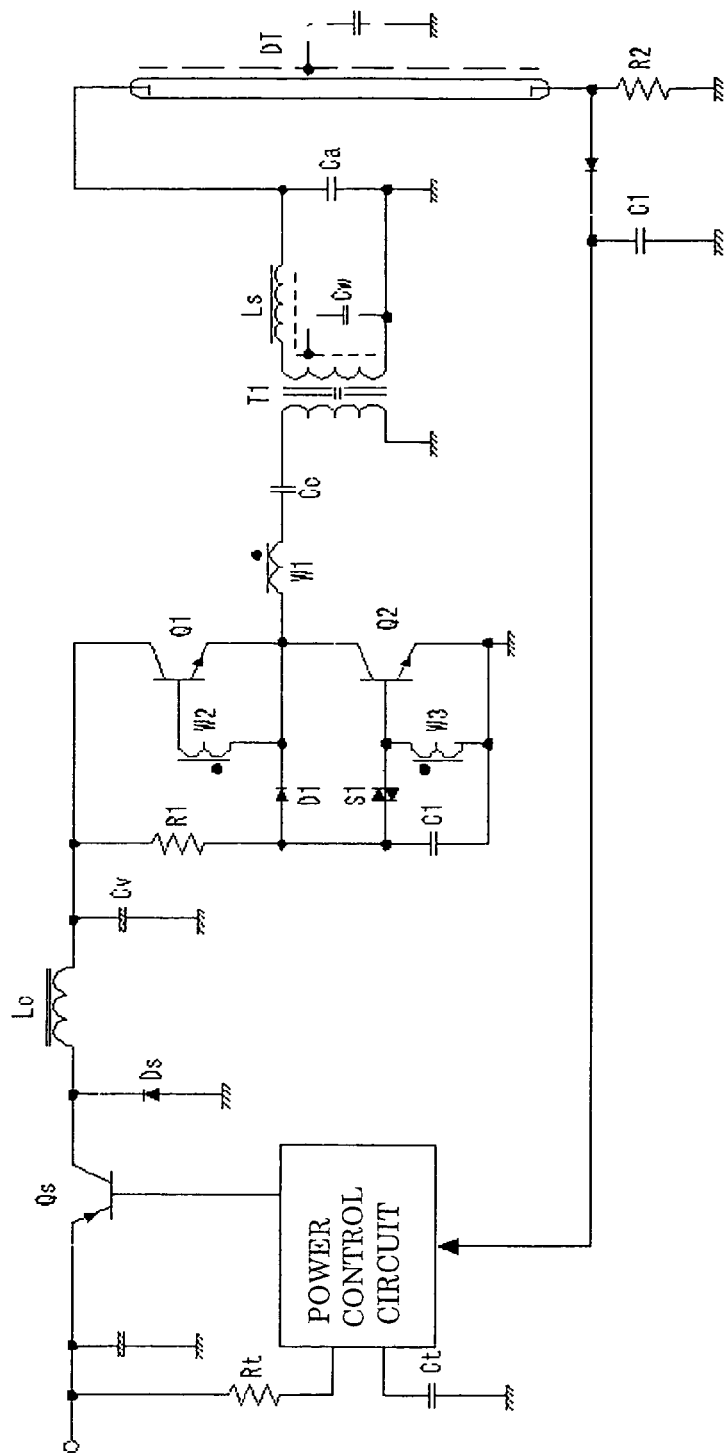
FIG. 31 is a circuit structural diagram showing one example of a dimmer circuit of an inverter circuit for a cold cathode fluorescent lamp which combines a conventional current-mode resonant circuit, a DC-DC converter circuit and a leakage flux transformer.
Figure 32:
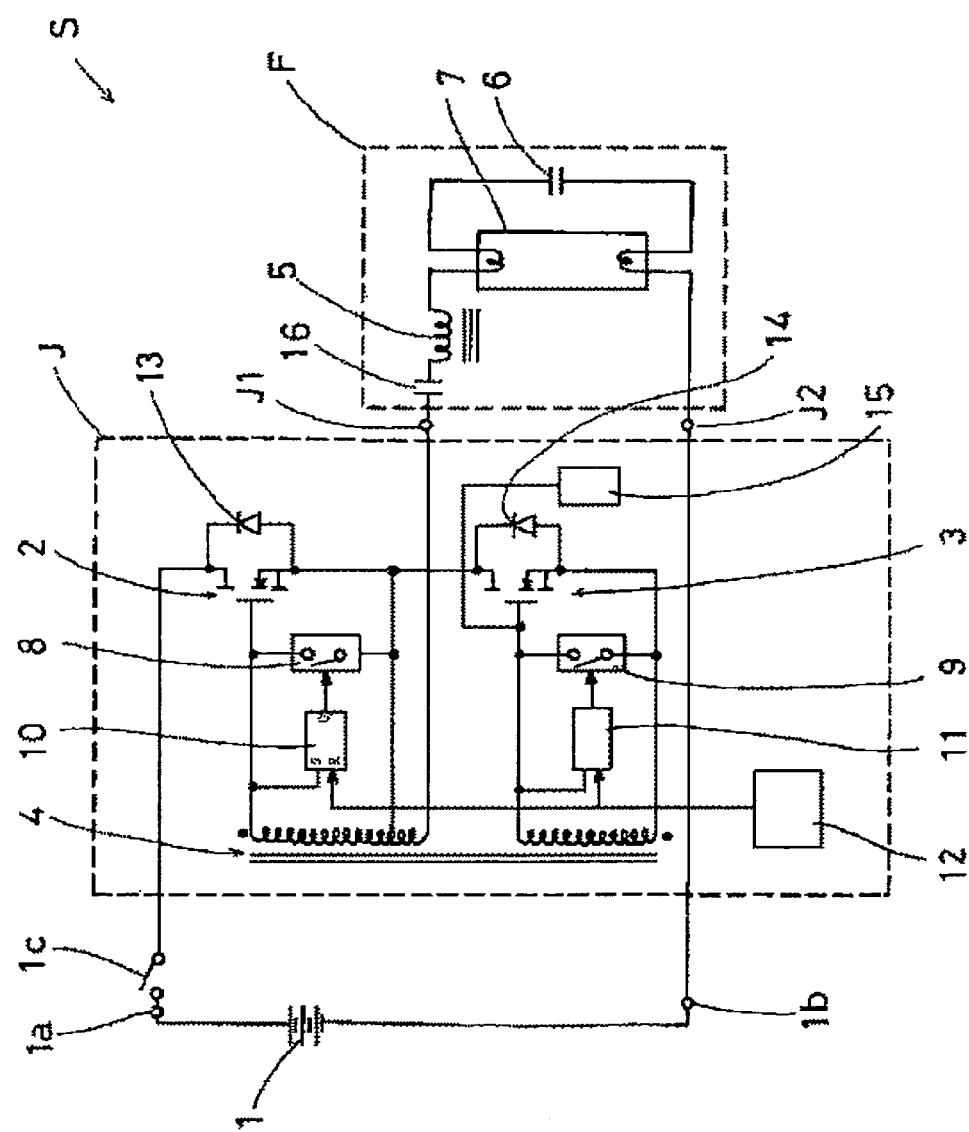
FIG. 32 is an explanatory diagram showing means for detecting zero current in a conventional zero current switching circuit, turning on switching means, and then turning off the switching means after a prescribed period of time.
Figure 33:
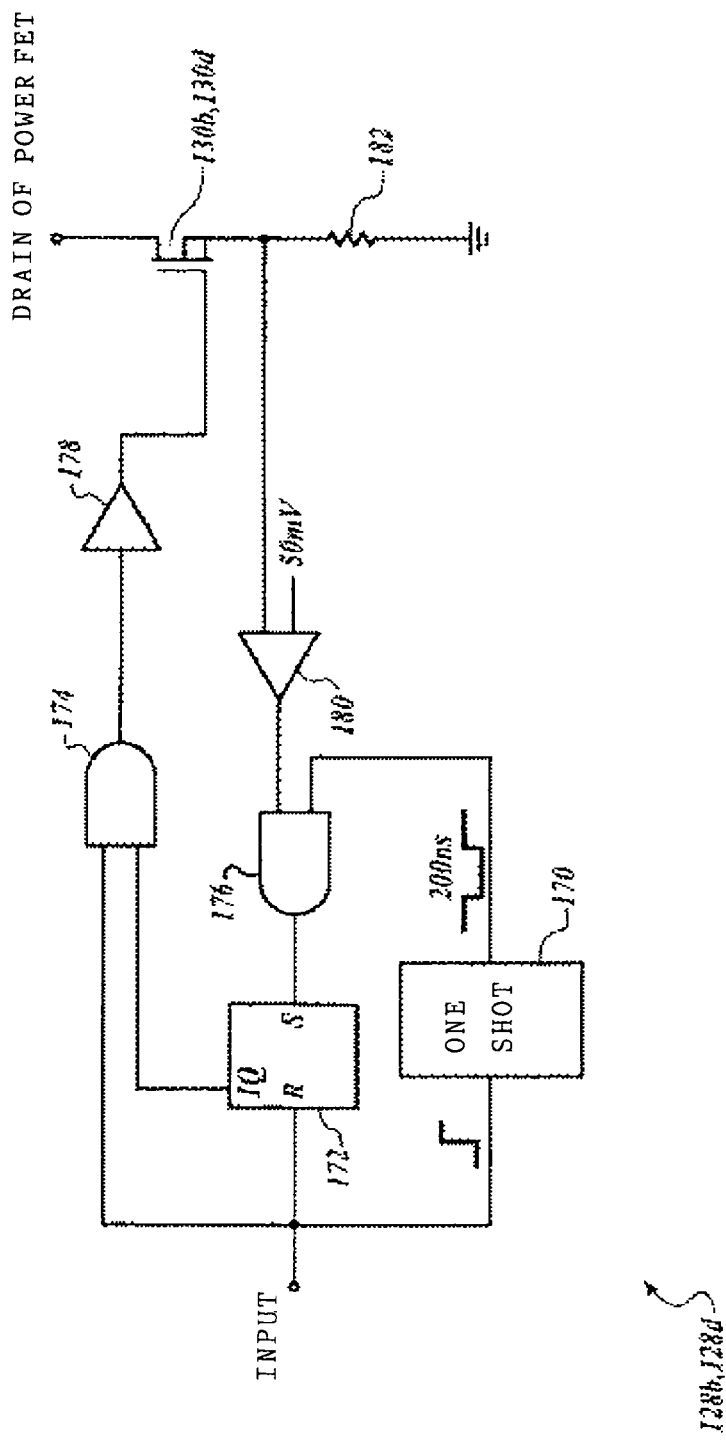
FIG. 33 is an explanatory diagram showing a conventional RS flip-flop which is set at zero current and reset after a prescribed period of time.
Figure 34:
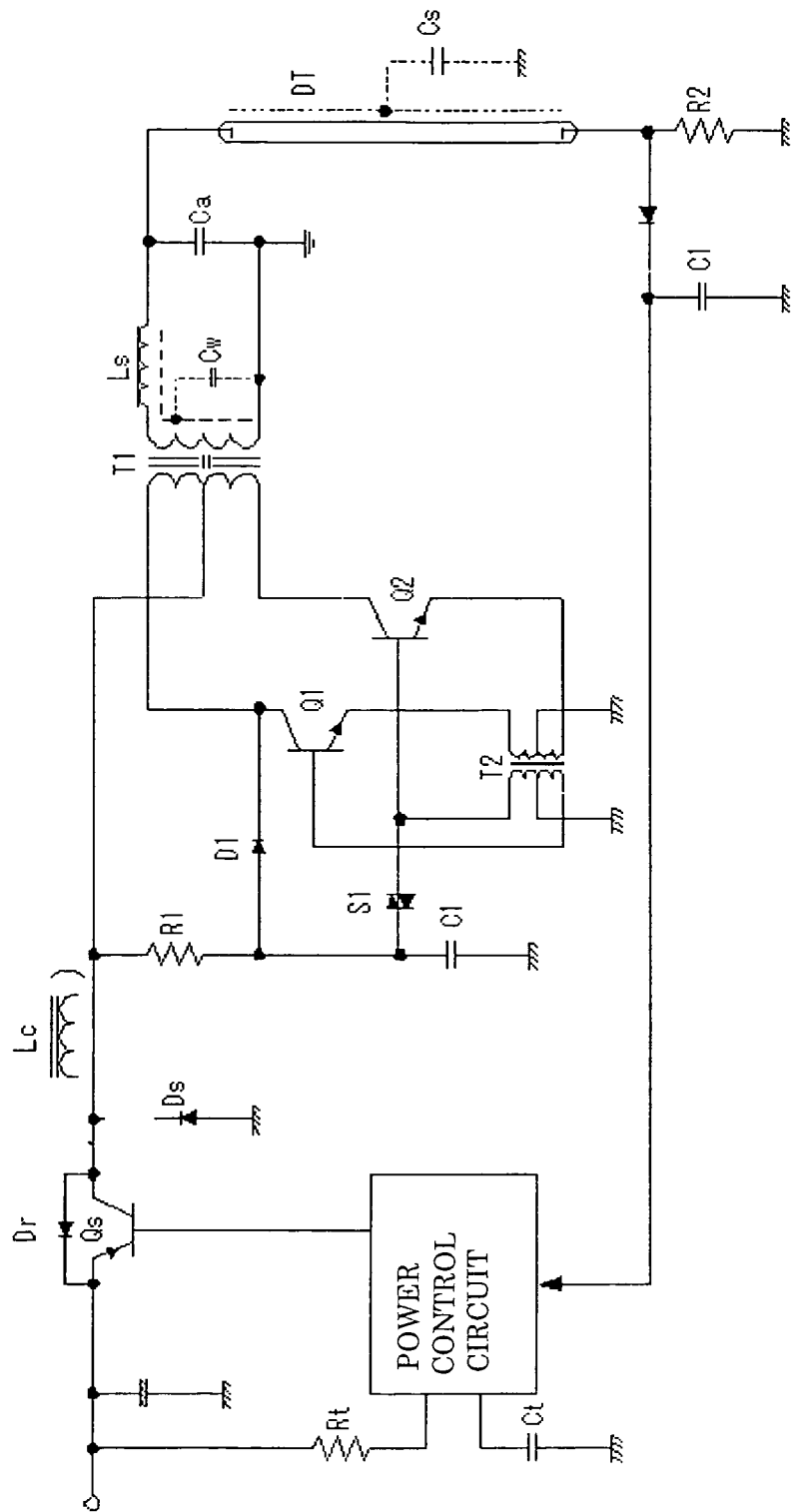
FIG. 34 is a circuit structural diagram showing one example of a conventional current-mode resonant inverter circuit for a discharge lamp.
Figure 35:
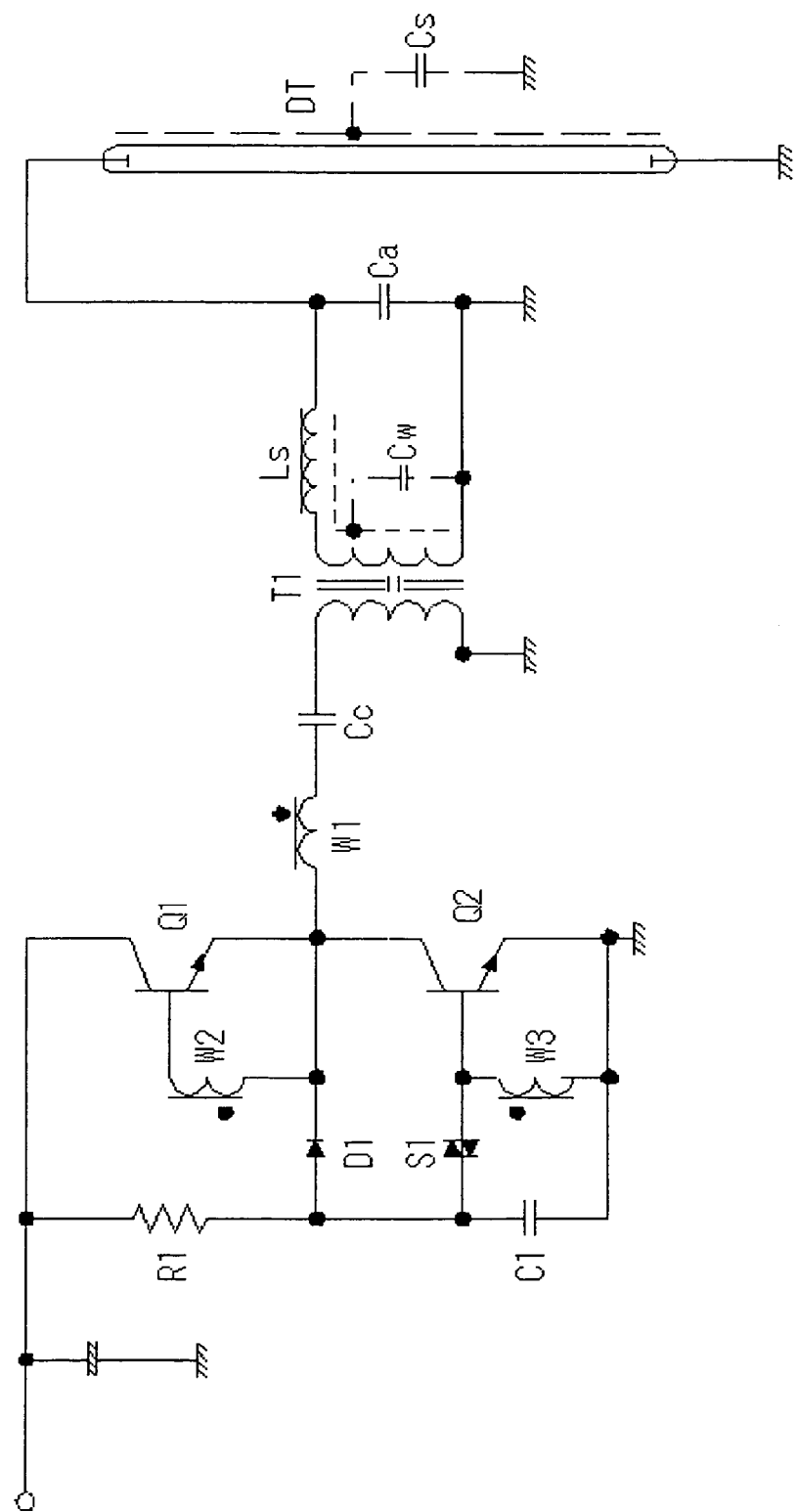
FIG. 35 is a circuit structural diagram illustrating an inverter circuit for lighting a cold cathode fluorescent lamp, in which the conventional current-mode resonant circuit is composed of a half-bridge circuit.

FIG. 17 and FIG. 18 show the power control method according to the present invention. FIG. 17 shows a case in which the duty ratio becomes smaller so as to reduce the power of the inverter circuit. FIG. 18 shows a case in which the duty ratio becomes larger so as to increase the inverter circuit power. The voltage waveform changes the duty ratio with the peak of the current waveform as a center for power control. Since either case is controlled so that the voltage effective value shown with broken line and the current are almost in phase, the power factor is always good as seen from the step-up transformer primary winding side.

This means that almost no exciting current flows. The fact that almost no exciting current flows means that the self-inductance of the step-up transformer primary winding can be small as long as it is driven under the ideal conditions. This leads to a drastic change in the design concept of the step-up transformer for a discharge lamp.

Specifically, the permeability of the core material may be lower then in a conventional one and the number of turns of the transformer primary and secondary windings may be smaller than in a conventional transformer. Particularly, if the number of turns of the transformer secondary winding is too large, as disclosed in Japanese Patent No. 2733817 and Japanese Laid-Open Patent Publication No. 2003-365326, due to the distributed constant transformer secondary winding, the structure of dense coupling and thin coupling appear (specifically, $\lambda\frac{1}{4}$ self-resonance). Since the self-resonance effect is an important parameter which determines the maximum value for the number of turns of the secondary winding of the step-up transformer for a discharge lamp, it is significantly important that the number of turns of the transformer secondary winding can be smaller.

Furthermore, considering the point disclosed in Japanese Patent Application No. 2003-365326 Corresponding to US Patent Application Publication No. US-2005-88113, it is implied that a step-up transformer which can convert larger power can be achieved in spite of the small shape (dimension) thereof.

EFFECT OF THE INVENTION

According to the present invention, the simple circuit, when compared with the conventional collector resonant circuit, can drastically improve the conversion efficiency of the inverter circuit. As a result, less heat is generated in the inverter circuit.

Also, an integrated circuit can be configured by the application of the principles of the present invention. In that case, since the circuit configuration inside the IC becomes extremely simple, the circuit with a lower cost can be configured.

Also, since the resonance frequency of the secondary side resonant circuit is accurately reflected in the operational frequency of the inverter circuit, the frequency deviation caused by change in parasitic capacitance or the like can be responded easily, thereby making the inverter circuit more reliable.

Also, although the value of the parasitic capacitance generated around the discharge lamp is an important parameter for determining the resonance frequency on the secondary side circuit, there has been no sign of this parameter being specified as of the time of the present application.

These are great problems facing industrial development. According to the present invention, however, since the current-mode resonant circuit searches for the optimum drive frequency automatically, the inverter circuit easily operates even though the important parameters have not been disclosed yet.

Also, the present invention can raise awareness of the importance of the parasitic capacitance around the discharge lamp on the secondary side circuit among those skilled in the art at the same time.

Also, according to the present invention, since the primary resonant circuit can be set at a high value for Q, the operational frequency of the inverter circuit can be stabilized, thereby achieving the inverter circuit reducing frequency deviation.

Also, the transformer becomes smaller at the same time. In contrast, if a transformer with the same outer diameter size as one used in the conventional collector resonant circuit, the transformer can be used with about 50% to 100% more power. In this case, it is needless to say that the number of turns of the transformer secondary winding has to be changed so as to have an adequate leakage inductance. It is also needless to say that the transformer thus achieved, although the same as the conventional type in outer diameter size and shape, completely differs in electrical characteristics.

Also, even when lighting multiple discharge lamps at the same time by a single inverter circuit, since the secondary side circuit can be set at a high value for Q, the circuit for lighting multiple discharge lamps by a single circuit is easily achieved.

Also, when driving an external electrode fluorescent lamp (EEFL) or the like, driving is possible at a higher voltage by resonance step-up, thereby achieving an inverter circuit which is highly efficient in driving.

What is claimed is:

1. A current-mode resonant inverter circuit for a discharge lamp comprising:
   a step-up transformer including a primary winding and secondary winding, the secondary winding exhibiting a leakage inductance;
   a secondary side circuit connected to the secondary winding of the step-up transformer, the secondary side circuit including a capacitive component, which is connected in series between the secondary winding and an element connected to ground, the capacitive component exhibiting an auxiliary capacitance, the secondary side circuit being operably connected to the discharge lamp;
   current detecting means for detecting a phase of current flowing through the capacitive component in the secondary side circuit, the current detecting means comprising the element, which is connected in series between the capacitive component and ground; and
   switching means for determining a switching timing in response to an output from the current detecting means, the switching means driving the primary winding of the step-up transformer during operation of the current-mode resonant inverter circuit in causing a continuous discharge of the discharge lamp,
   wherein the capacitive component and the step-up transformer secondary winding are connected such that in combination the auxiliary resonance capacitance exhibit characteristics of a series resonant circuit, and
   the switching means drives the primary winding according to the switching timing so that an effective voltage applied to the primary winding coincides substantially in phase with the detected current and oscillates self-excitedly substantially at a resonance frequency of the series resonant circuit during the operation of the current-mode resonant inverter circuit.

2. The current-mode resonant inverter circuit for a discharge lamp according to claim 1, wherein:
   the primary winding of the step-up transformer has a center tap, the center tap being connected to a power source; and
   each end of the primary winding has a terminal connected to ground through a transistor.

3. A current-mode resonant inverter circuit for a discharge lamp according to claim 2, further comprising:
   a comparator for comparing a voltage generated in the current detecting means and a voltage in a power control signal, the comparator outputting a control waveform whose amplitude increases and decreases evenly in correspondence with the peaks and valleys of the voltage generated in the current detecting means,
   wherein the control waveform causes the switching means to switchably bring the step-up transformer into conduction with a power source.

4. A current-mode resonant inverter circuit for a discharge lamp according to claim 1, further comprising:
  a comparator for comparing a voltage generated in the current detecting means and a voltage in a power control signal, the comparator outputting a control waveform whose amplitude increases and decreases evenly in correspondence with the peaks and valleys of the voltage generated in the current detecting means,
  wherein the control waveform causes the switching means to switchably bring the step-up transformer into conduction with a power source.

5. A current-mode resonant inverter circuit according to claim 1, wherein the element of the current detecting means is a Zener diode having one end connected to the capacitive component and the other end connected to ground.

6. A current-mode resonant inverter circuit has the current detecting method according to claim 1, wherein the element of the current detecting method is a photocoupler.

7. A current-mode resonant inverter circuit for a discharge lamp comprising:
  a step-up transformer including a primary and a secondary winding, the secondary winding exhibiting a leakage inductance;
  a secondary side circuit connected to the secondary winding of the step-up transformer, the secondary side circuit including a capacitive component exhibiting an auxiliary capacitance, the secondary side circuit being operably connected to the discharge lamp;
  current detecting means for detecting a phase of current flowing through the secondary winding of the step-up transformer, the current detecting means comprising an element connected in series with the secondary winding; and
  switching means for determining a switching timing in response to an output from the current detecting means, the switching means driving a primary winding of the step-up transformer during an operation of the current-mode resonant inverter circuit in causing a continuous discharge of the discharge lamp,
  wherein the secondary winding of the step-up transformer and the capacitive component are connected such that the leakage inductance of the step-up transformer secondary winding and the auxiliary resonance capacitance in combination exhibit characteristics of a series resonant circuit, and
  wherein the switching means drives the primary winding according to the switching timing so that an effective voltage applied to the primary winding coincides substantially in phase with the detected current and oscillates self-excitedly substantially at a resonance frequency of the series resonant circuit during the operation of the current-mode resonant inverter circuit.

8. The current-mode resonant inverter circuit for a discharge lamp according to claim 7, wherein:
  the primary winding of the step-up transformer has a center tap, the center tap being connected to a power source, and
  each end of the primary winding has a terminal connected to ground through a transistor.

9. A current-mode resonant inverter circuit according to claim 7, wherein the element of the current detecting means is a Zener diode having one end connected to the secondary winding and the other end connected to ground.

10. A current-mode resonant inverter circuit has the current detecting method according to claim 7, wherein the element of the current detecting method is a photocoupler.

11. A current-mode resonant inverter circuit for a discharge lamp according to claim 7, further comprising:
  a comparator for comparing a voltage generated in the current detecting means and a voltage in a power control signal, the comparator outputting a control waveform whose amplitude increases and decreases evenly in correspondence with the peaks and valleys of the voltage generated in the current detecting means,
  wherein the control waveform causes the switching means to switchably bring the step-up transformer into conduction with a power source.

12. A current-mode resonant inverter circuit for a discharge lamp comprising:
  a full-bridge type circuit, the full-bridge type circuit having a step-up transformer, wherein a secondary winding of the step-up transformer is connected to a secondary side circuit operably connected to the discharge lamp;
  current detecting means for detecting a phase of current flowing through at least one of: the secondary winding of the step-up transformer and a capacitive component in the secondary side circuit;
  switching means for determining a switching timing in response to an output from the current detecting means, the switching means driving a primary winding of the step-up transformer during an operation of the current-mode resonant inverter circuit in causing a continuous discharge of the discharge lamp; and
  a comparator for comparing a voltage generated in the current detecting means and a voltage in a power control signal so as to create a control waveform increasing and decreasing evenly in correspondence with the peaks and valleys of the voltage generated in the current detecting means,
  wherein the secondary winding of the step-up transformer and the capacitive component are connected such that the leakage inductance of the step-up transformer secondary winding and the auxiliary resonance capacitance in combination exhibit characteristics of a series resonant circuit,
  wherein the current-mode resonant inverter circuit oscillates self-excitedly at a resonance frequency of the series resonant circuit based on the determined switching timing,
  wherein the control waveform causes the switching means to switchably bring the step-up transformer into conduction with a power source in such a manner as to drive the primary winding so that an effective voltage applied to the primary winding coincides substantially in phase with the detected current and oscillates self-excitedly substantially at a resonance frequency of the series resonant circuit during the operation of the current-mode resonant inverter circuit, and
  wherein the current detecting means comprises an element connected in series with the at least one of the secondary winding and the capacitive component.

* * * * *